US010474991B2

(12) United States Patent
Fisher et al.

(10) Patent No.: US 10,474,991 B2
(45) Date of Patent: Nov. 12, 2019

(54) DEEP LEARNING-BASED STORE REALOGRAMS

(71) Applicant: STANDARD COGNITION, CORP, San Francisco, CA (US)

(72) Inventors: Jordan E. Fisher, San Francisco, CA (US); Daniel L. Fischetti, San Francisco, CA (US); Michael S. Suswal, San Francisco, CA (US); Nicholas J. Locascio, San Francisco, CA (US)

(73) Assignee: Standard Cognition, Corp., San Francisco, CA (US)

( * ) Notice: Subject to any disclaimer, the term of this patent is extended or adjusted under 35 U.S.C. 154(b) by 0 days.

(21) Appl. No.: 16/256,355

(22) Filed: Jan. 24, 2019

(65) Prior Publication Data

US 2019/0156273 A1 May 23, 2019

Related U.S. Application Data

(63) Continuation-in-part of application No. 15/945,473, filed on Apr. 4, 2018, which is a continuation-in-part (Continued)

(51) Int. Cl.
*G06Q 10/08* (2012.01)
*G06N 3/04* (2006.01)
(Continued)

(52) U.S. Cl.
CPC ............ *G06Q 10/087* (2013.01); *G06N 3/04* (2013.01); *G06N 3/08* (2013.01); *G06T 7/70* (2017.01);
(Continued)

(58) Field of Classification Search
CPC .. G06K 9/00335; G06K 9/00771; G06N 3/04; G06Q 10/087; G06T 2207/10016;
(Continued)

(56) References Cited

U.S. PATENT DOCUMENTS 6,154,559 A 11/2000 Beardsley
7,050,624 B2 5/2006 Dialameh et al.
(Continued)

FOREIGN PATENT DOCUMENTS

CN 104778690 B 6/2017
EP 1574986 B1 7/2008
(Continued)

OTHER PUBLICATIONS

Black et al., "Multi View Image Surveillance and Tracking," IEEE Proceedings of the Workshop on Motion and Video Computing, 2002, pp. 1-6.
(Continued)

*Primary Examiner* — Anner N Holder
(74) *Attorney, Agent, or Firm* — Haynes Beffel & Wolfeld LLP

(57) ABSTRACT

Systems and techniques are provided for tracking inventory items in an area of real space. A plurality of cameras, or other sensors, produce respective sequences of images in corresponding fields of view in the real space. The field of view of each camera overlaps with the field of view of at least one other camera. The system is coupled to the plurality of cameras and uses the sequences of images produced by at least two cameras in the plurality of cameras to identify inventory events. The inventory event includes an item identifier, a location and a timestamp. A plurality of cells having coordinates in the area of real space are stored as a data set in the memory. The processing system calculates scores at a scoring time, for inventory items having locations
(Continued)

matching particular cells using respective counts of inventory events.

24 Claims, 21 Drawing Sheets

Related U.S. Application Data of application No. 15/907,112, filed on Feb. 27, 2018, now Pat. No. 10,133,933, which is a continuation-in-part of application No. 15/847,796, filed on Dec. 19, 2017, now Pat. No. 10,055,853.

(60) Provisional application No. 62/542,077, filed on Aug. 7, 2017, provisional application No. 62/703,785, filed on Jul. 26, 2018.

(51) Int. Cl.
  *G06N 3/08* (2006.01)
  *G06T 7/20* (2017.01)
  *G06T 7/70* (2017.01)

(52) U.S. Cl.
  CPC ...... *G06T 7/20* (2013.01); *G06T 2207/10004* (2013.01); *G06T 2207/30196* (2013.01)

(58) Field of Classification Search
  CPC . G06T 2207/20084; G06T 2207/30196; G06T 7/194
  See application file for complete search history.

(56) References Cited

U.S. PATENT DOCUMENTS

| | | | |
|---|---|---|---|
| 8,009,863 B1 | 8/2011 | Sharma et al. | |
| 8,261,256 B1 | 9/2012 | Adler et al. | |
| 8,577,705 B1 | 11/2013 | Baboo et al. | |
| 8,624,725 B1 | 1/2014 | MacGregor | |
| 9,036,028 B2 * | 5/2015 | Buehler | G08B 13/19602 |
| | | | 348/159 |
| 9,294,873 B1 | 3/2016 | MacGregor | |
| 9,449,233 B2 | 9/2016 | Taylor | |
| 9,489,623 B1 | 11/2016 | Sinyayskiy et al. | |
| 9,536,177 B2 | 1/2017 | Chalasani et al. | |
| 9,582,891 B2 | 2/2017 | Geiger et al. | |
| 9,652,751 B2 | 5/2017 | Aaron et al. | |
| 9,881,221 B2 | 1/2018 | Bala et al. | |
| 9,911,290 B1 | 3/2018 | Zalewski et al. | |
| 10,055,853 B1 | 8/2018 | Fisher et al. | |
| 10,127,438 B1 | 11/2018 | Fisher et al. | |
| 10,133,933 B1 | 11/2018 | Fisher et al. | |
| 10,165,194 B1 | 12/2018 | Baldwin | |
| 10,175,340 B1 | 1/2019 | Abari et al. | |
| 10,210,737 B2 | 2/2019 | Zhao | |
| 2003/0107649 A1 | 6/2003 | Flickner et al. | |
| 2004/0099736 A1 * | 5/2004 | Neumark | G06K 17/0022 |
| | | | 235/385 |
| 2004/0131254 A1 | 7/2004 | Liang et al. | |
| 2006/0132491 A1 | 6/2006 | Riach et al. | |
| 2006/0279630 A1 | 12/2006 | Aggarwal et al. | |
| 2007/0282665 A1 | 12/2007 | Buehler et al. | |
| 2008/0159634 A1 | 7/2008 | Sharma et al. | |
| 2008/0181507 A1 | 7/2008 | Gope et al. | |
| 2008/0211915 A1 | 9/2008 | McCubbrey | |
| 2008/0243614 A1 | 10/2008 | Tu et al. | |
| 2009/0041297 A1 | 2/2009 | Zhang et al. | |
| 2009/0057068 A1 | 3/2009 | Lin et al. | |
| 2009/0083815 A1 | 3/2009 | McMaster et al. | |
| 2009/0217315 A1 | 8/2009 | Malik et al. | |
| 2010/0103104 A1 | 4/2010 | Son et al. | |
| 2010/0208941 A1 | 8/2010 | Broaddus et al. | |
| 2010/0283860 A1 | 11/2010 | Nader | |
| 2011/0317016 A1 | 12/2011 | Saeki et al. | |
| 2011/0320322 A1 | 12/2011 | Roslak et al. | |
| 2012/0159290 A1 | 6/2012 | Pulsipher et al. | |
| 2012/0209749 A1 | 8/2012 | Hammad et al. | |
| 2013/0011049 A1 | 1/2013 | Kimura | |
| 2013/0076898 A1 | 3/2013 | Philippe et al. | |
| 2013/0156260 A1 | 6/2013 | Craig | |
| 2014/0168477 A1 | 6/2014 | David | |
| 2014/0282162 A1 | 9/2014 | Fein et al. | |
| 2014/0304123 A1 | 10/2014 | Schwartz | |
| 2015/0019391 A1 | 1/2015 | Kumar et al. | |
| 2015/0026010 A1 | 1/2015 | Ellison | |
| 2015/0026646 A1 | 1/2015 | Ahn et al. | |
| 2015/0039458 A1 | 2/2015 | Reid | |
| 2015/0049914 A1 | 2/2015 | Alves | |
| 2015/0206188 A1 | 7/2015 | Tanigawa et al. | |
| 2015/0221094 A1 | 8/2015 | Marcheselli et al. | |
| 2015/0262116 A1 | 9/2015 | Katircioglu et al. | |
| 2015/0269740 A1 | 9/2015 | Mazurenko et al. | |
| 2015/0294397 A1 * | 10/2015 | Croy | G06Q 30/0603 |
| | | | 705/26.9 |
| 2015/0302593 A1 | 10/2015 | Mazurenko et al. | |
| 2015/0310459 A1 | 10/2015 | Bemal et al. | |
| 2016/0125245 A1 | 5/2016 | Saitwal et al. | |
| 2016/0171707 A1 * | 6/2016 | Schwartz | G06K 9/00201 |
| | | | 382/180 |
| 2016/0217417 A1 | 7/2016 | Ma et al. | |
| 2016/0358145 A1 | 12/2016 | Montgomery | |
| 2016/0381328 A1 | 12/2016 | Zhao | |
| 2017/0068861 A1 | 3/2017 | Miller et al. | |
| 2017/0116473 A1 | 4/2017 | Sashida et al. | |
| 2017/0206669 A1 | 7/2017 | Saleemi et al. | |
| 2017/0278255 A1 | 9/2017 | Shingu et al. | |
| 2017/0309136 A1 | 10/2017 | Schoner | |
| 2017/0323376 A1 | 11/2017 | Glaser et al. | |
| 2018/0012072 A1 | 1/2018 | Glaser et al. | |
| 2018/0012080 A1 | 1/2018 | Glaser et al. | |
| 2018/0014382 A1 | 1/2018 | Glaser et al. | |
| 2018/0025175 A1 | 1/2018 | Kato | |
| 2018/0033015 A1 | 2/2018 | Opalka et al. | |
| 2018/0068431 A1 | 3/2018 | Takeda et al. | |
| 2018/0070056 A1 | 3/2018 | DeAngelis et al. | |
| 2018/0088900 A1 | 3/2018 | Glaser et al. | |
| 2018/0150788 A1 | 5/2018 | Vepakomma et al. | |
| 2018/0165728 A1 | 6/2018 | McDonald et al. | |
| 2018/0225625 A1 | 8/2018 | DiFatta et al. | |
| 2018/0232796 A1 | 8/2018 | Glaser et al. | |
| 2018/0240180 A1 | 8/2018 | Glaser et al. | |
| 2018/0322616 A1 | 11/2018 | Guigues | |
| 2018/0329762 A1 | 11/2018 | Li et al. | |
| 2018/0332235 A1 | 11/2018 | Glaser | |
| 2018/0332236 A1 | 11/2018 | Glaser et al. | |
| 2018/0343417 A1 | 11/2018 | Davey | |
| 2018/0365755 A1 * | 12/2018 | Bekbolatov | G06Q 30/0639 |
| 2018/0373928 A1 | 12/2018 | Glaser et al. | |
| 2019/0005479 A1 | 1/2019 | Glaser et al. | |
| 2019/0034735 A1 | 1/2019 | Cuban et al. | |

FOREIGN PATENT DOCUMENTS

| | | |
|---|---|---|
| JP | 2013196199 A | 9/2013 |
| JP | 201489626 A | 5/2014 |
| WO | 0021021 A1 | 4/2000 |
| WO | 02059836 A3 | 5/2003 |
| WO | 2008029159 A1 | 3/2008 |
| WO | 2017151241 A2 | 9/2017 |
| WO | 2017196822 A1 | 11/2017 |
| WO | 2018013438 A1 | 1/2018 |
| WO | 2018013439 A1 | 1/2018 |
| WO | 2018148613 A1 | 8/2018 |
| WO | 2018209156 A1 | 11/2018 |
| WO | 2018237210 A1 | 12/2018 |

OTHER PUBLICATIONS

Grinciunaite et al. "Human Pose Estimation in Space and Time Using 3D CNN," ECCV Workshop on Brave new ideas or motion representations in videos, Oct. 2016, 7 pages.

(56) References Cited

OTHER PUBLICATIONS

Harville, "Stereo person tracking with adaptive plan-view templates of height and occupancy statistics," Image and Vision Computing, vol. 22, Issue 2, Feb. 1, 2004, pp. 127-142.
He et al. "Identity mappings in deep residual networks" (published at https://arxiv.org/pdf/1603.05027.pdf), Jul. 25, 2016, 15 pages.
Huang, et al. "Driver's view and vehicle surround estimation using omnidirectional video stream," IEEE IV2003 Intelligent Vehicles Symposium. Proceedings (Cat. No. 03TH8683), Jun. 9-11, 2003, pp. 444-449.
Longuet-Higgens, "A computer algorithm for reconstructing a scene from two projections," Nature 293, Sep. 10, 1981, pp. 133-135.
PCT/US2018/043933—International Search Report and Written Opinion dated Nov. 7, 2018, 12 pages.
PCT/US2018/043934—International Search Report and Written Opinion dated Feb. 1, 2019, 15 pages.
PCT/US2018/043937—International Search Report and Written Opinion dated Oct. 31, 2018, 17 pages.
PCT/US2018/043939—International Search Report and Written Opinion dated Jan. 2, 2019, 17 pages.
Redmon et al., "YOLO9000: Better, Faster, Stronger," (available at https://arxiv.org/pdf/1612.08242.pdf), Dec. 25, 2016, 9 pages.
Redmon et al., "You Only Look Once: Unified, Real-Time Object Detection," University of Washington, Allen Institute for AIy, Facebook AI Research, May 9, 2016, 10 pages.
Rossi et al., "Tracking and Counting Moving People," IEEE Inn Conf. on Image Processing, ICIP-94, Nov. 13-16, 1994, 5 pages.
Toshev et al. "DeepPose: Human Pose Estimation via Deep Neural Networks," IEEE Conf. on Computer Vision and Pattern Recognition, Aug. 2014, 8 pages.
U.S. Notice of Allowance in U.S. Appl. No. 15/847,796 dated May 10, 2018, 8 pages.
U.S. Notice of Allowance in U.S. Appl. No. 15/907,112 dated Sep. 18, 2018, 7 pages.
U.S. Office Action in U.S. Appl. No. 15/907,112 dated Jun. 26, 2018, 11 pages.
U.S. Office Action in U.S. Appl. No. 15/945,466 dated Jul. 20, 2018, 12 pages.
U.S. Office Action in U.S. Appl. No. 16/255,573, dated Mar. 18, 2019, 27 pages.
U.S. Office Action in U.S. Appl. No. 16/256,904, dated Mar. 19, 2019, 15 pages.
U.S. Response to NFOA in U.S. Appl. No. 15/907,112 dated Jul. 25, 2018, 12 pages.
U.S. Response to NFOA in U.S. Appl. No. 15/945,466 dated Jul. 25, 2018, 12 pages.
U.S. Appl. No. 15/945,466—Notice of Allowance dated Aug. 31, 2018, 7 pages.
U.S. Appl. No. 15/945,473—Office Action dated Jan. 24, 2019, 17 pages.
U.S. Office Action in U.S. Appl. No. 15/945,473 dated Aug. 8, 2018, 17 pages.
Vincze, "Robust tracking of ellipses at frame rate," Pattern Recognition, vol. 34, Issue 2, Feb. 2001, pp. 487-498.
Zhang "A Flexible New Technique for Camera Calibration," IEEE Transactions on Pattern Analysis and Machine Intelligence, vol. 22, No. 11, Nov. 2000, 22pages.
U.S. Appl. No. 15/945,473—Final Office Action dated Apr. 23, 2019, 9 pages.
U.S. Appl. No. 16/256,358—Office Action dated Mar. 28, 2019, 7 pages.
U.S. Appl. No. 16/256,361—Office Action dated Apr. 4, 2019, 9 pages.
U.S. Appl. No. 16/256,904—Notice of Allowance dated Jun. 12, 2019, 7 pages.
U.S. Appl. No. 16/256,904—Response to Office Action dated Mar. 19, 2019, 16 pages.
U.S. Appl. No. 16/256,936—Office Action dated May 16, 2019, 11 pages.

\* cited by examiner

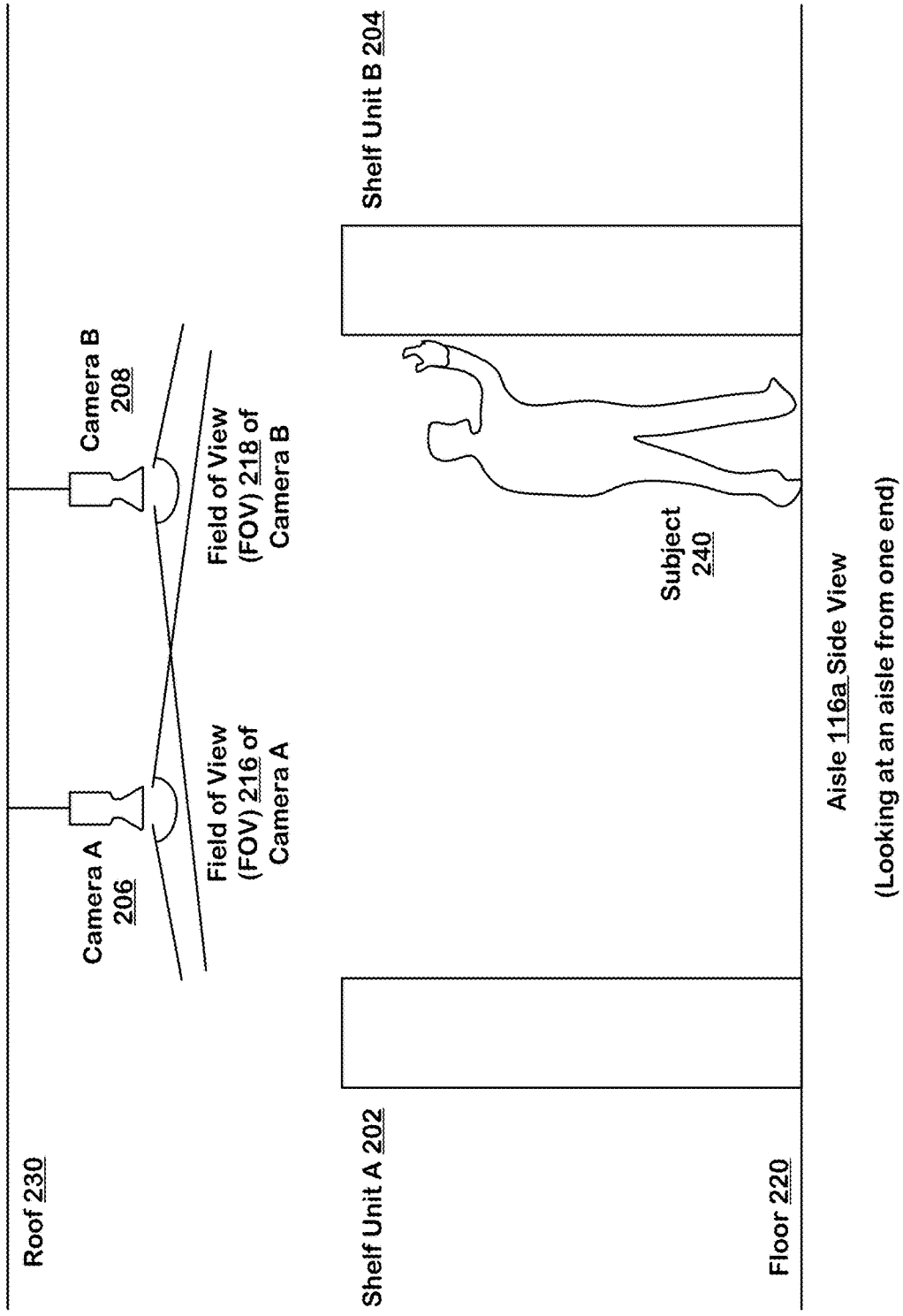

Perspective View of Shelf Unit B in Aisle 116a

```
Joint = {
    (x, y) position of joint,
    joint number (one of 19 possibilities, e.g., 1 = left-ankle, 2 = right-ankle),
    confidence number (describing how confident CNN is in its prediction),
    unique integer-ID for the joint
}
```

Joints data structure 400

FIG. 4

```
Subject = { Key   = frame_id
            Value = { Key   = camera_id
                      Value = Assigned joints to subject
                      {
                          [x of joint1, y of joint1, z of joint1],
                          [x of joint2, y of joint2, z of joint2],
                          ..........
                          ..........
                          [x of joint18, y of joint18, z of joint18],
                      ]
                    }
          }
```

Subject Data Structure 500

FIG. 5

```
Inventory/Log = {  Key   = Identifier (store_Id / shelf_id / subject_id)
                   Value = { Key  = SKU
                             Value = integer (quantity) + frame_id
                           }
                }
```

Inventory/Log Data Structure 700

FIG. 7

DEEP LEARNING-BASED STORE REALOGRAMS

PRIORITY APPLICATION

This application claims the benefit of U.S. Provisional Patent Application No. 62/703,785 filed 26 Jul. 2018, which application is incorporated herein by reference; and is a continuation-in-part of U.S. patent application Ser. No. 15/945,473 filed 4 Apr. 2018, which is a continuation-in-part of U.S. patent application Ser. No. 15/907,112 filed 27 Feb. 2018, (now issued U.S. Pat. No. 10,133,933) issued on 20 Nov. 2018, which is a continuation-in-part of U.S. patent application Ser. No. 15/847,796, filed 19 Dec. 2017 (now U.S. Pat. No. 10,055,853), which claims benefit of U.S. Provisional Patent Application No. 62/542,077 filed 7 Aug. 2017, which applications are incorporated herein by reference.

BACKGROUND

Field

The present invention relates to systems that track inventory items in an area of real space including inventory display structures.

Description of Related Art

Determining quantities and locations of different inventory items stocked in inventory display structures in an area of real space, such as a shopping store is required for efficient operation of the shopping store. Subjects in the area of real space, such as customers, take items from shelves and put the items in their respective shopping carts or baskets. Customers may also put items back on the same shelf, or another shelf, if they do not want to buy the item. Thus, over a period of time, the inventory items are taken off from their designated locations on shelves and can be dispersed to other shelves in the shopping store. In some systems, the quantity of stocked items is available after considerable delay as it requires consolidation of sale receipts with the stocked inventory. The delay in availability of information regarding quantities of items stocked in a shopping store can affect customers' purchase decisions as well as store management's action to order more quantities of inventory items that are in high demand.

It is desirable to provide a system that can more effectively and automatically provide, in real time, quantities of items stocked on shelves and also identify location of items on the shelves.

SUMMARY

A system, and method for operating a system, are provided for tracking inventory item an area of real space. A plurality of cameras or other sensors produce respective sequences of images of corresponding fields of view in the real space. The system is coupled to the plurality of sensors and includes processing logic that uses the sequences of images produced by at least two sensors to identify inventory events. The system tracks inventory items in the area of real space in response to the inventory events.

A system and method are provided for tracking inventory items in an area of real space. A plurality of cameras or other sensors produces respective sequences of images of corresponding fields of view in the real space. The field of view of each sensor overlaps with the field of view of at least one other sensor in the plurality of sensors. The system uses the sequences of images produced by at least two sensors in the plurality of sensors to identify inventory events. The system tracks locations of inventory items in the area of real space in response to the inventory events.

In one embodiment, the inventory events include an item identifier, a put or take indicator, locations represented by positions along three axes of the area of real space, and a timestamp. The system can include or have access to memory storing a data set defining plurality of cells having coordinates in the area of real space. The system includes logic to match locations of inventory items with coordinates of cells and maintains a data representing inventory items matched with cells in the plurality of cells. The area of real space can include a plurality of inventory locations. The coordinates of cells in the plurality of cells can correlate with inventory locations or portions of inventory locations in the plurality of inventory locations. The system includes logic to calculate scores at a scoring time, for inventory items having locations matching particular cells using respective counts of inventory events. The logic that calculates scores for cells uses sums of puts and takes of inventory items weighted by a separation between timestamps of the puts and takes and the scoring time. The system includes the logic to store scores in the memory.

In one embodiment, the system includes logic to render a display image representing cells in the plurality of cells and the scores for the cells. In this embodiment, the scores are represented by variations in color in the display image representing cells. The system includes logic to select a set of inventory items for each cell based on the scores. In one embodiment, the area of real space includes a plurality of inventory locations, and the coordinates of cells in the plurality of cells correlate with inventory locations in the plurality of inventory locations. In this embodiment, a data set in memory defines a plurality of cells having coordinates in the area of real space.

The system can include or have access to memory storing a planogram identifying inventory locations in the area of real space and inventory items to be positioned on inventory locations. The planogram can also include information about portions of inventory locations designated for particular inventory items. The planogram can be produced based on a plan for the arrangement of inventory items on the inventory locations in the area of real space.

The system includes logic to maintain data representing inventory items matched with cells in the plurality of cells. The system can also include logic to determine misplaced items by comparing the data representing inventory items matched with cells with the planogram.

The system can generate and store in memory a data structure referred to herein as a "realogram," identifying the locations of inventory items in the area of real space based on accumulation of data about the items identified in, and the locations of, the inventory events detected as discussed herein. The data in the realogram can be compared to data in a planogram, to determine how inventory items are disposed in the area compared to the plan, such as to locate misplaced items. Also, the realogram can be processed to locate inventory items in three dimensional cells, and correlate those cells with inventory locations in the store, such as can be determined from a planogram or other map of the inventory locations. Also, the realogram can be processed to track activity related to specific inventory items in different locations in the area. Other uses of realograms are possible as well.

A system and method are provided for tracking inventory items in an area of real space including inventory display structures. The system includes a plurality of cameras disposed above the inventory display structures. The cameras produce respective sequences of images of inventory display structures in corresponding fields of view in the real space. The field of view of each camera overlaps with the field of view of at least one other camera in the plurality of cameras. A data set defines a plurality of cells having coordinates in the area of real space. The data set is stored in memory. The system processes the sequences of images produced by the plurality of cameras to find locations of inventory events in three dimensions in the area of real space. In response to the inventory events, the system includes logic to determine a nearest cell in the data set based on the locations the inventory events. The system includes logic to system including logic that calculates scores at a scoring time for inventory items associated with the inventory events having locations matching particular cells using respective counts of inventory events.

In one embodiment, the system includes logic to select a set of inventory items for each cell based on the scores. In one embodiment, the inventory events include an item identifier, a put or a take indicator, locations represented by positions along three axes of the area of real space, and a timestamp. In one embodiment, the system includes data sets defining a plurality of cells represented as two dimensional grids having coordinates in the area of real space. The cells can correlate with portions of front plan of inventory locations. The processing system includes logic that determines the nearest cell based on the location of inventory event. In one embodiment, the system includes data set defining a plurality of cells represented as three dimensional grids having coordinates in the area of real space. The cells can correlate with portions of volume on inventory locations. The processing system includes logic that determines the nearest cell based on the location of inventory event. The put indicator identifies that the item is placed on an inventory location and the take indicator identifies that the item is taken off from the inventory location.

In one embodiment, the logic that processes the sequences of images produced by the plurality of cameras comprises image recognition engines. The image recognition engines generate data sets representing elements in the images corresponding to hands. The system includes logic that executes analysis of the data sets from sequences of images from at least two cameras to determine locations of inventory events in three dimensions. The image recognition engines comprise convolutional neural networks.

In one embodiment, the system includes logic that calculates scores for cells using sums of puts and takes of inventory items weighted by a separation between timestamps of the puts and takes and the scoring time. The scores are stored in the memory. In one embodiment, the logic to determine the nearest cell in the data set based on the location the inventory events includes calculating a distance from the location of the inventory event to cells in the data set and matching the inventory event with a cell based on the calculated distance.

Methods and computer program products which can be executed by computer systems are also described herein.

Functions described herein, including but not limited to identifying and linking an inventory event including the item associated with the inventory event to a cell in the plurality of cells having coordinates in the area of real space and of updating the store realogram present complex problems of computer engineering, relating for example to the type of image data to be processed, what processing of the image data to perform, and how to determine actions from the image data with high reliability.

Other aspects and advantages of the present invention can be seen on review of the drawings, the detailed description and the claims, which follow.

BRIEF DESCRIPTION OF THE DRAWINGS

FIG. 2A is a side view of an aisle in a shopping store illustrating a subject, inventory display structures and a camera arrangement in a shopping store.

FIG. 4 shows an example data structure for storing joints information of subjects.

FIG. 5 is an example data structure for storing a subject including the information of associated joints.

FIG. 7 shows an example of a log data structure which can be used to store shopping cart of a subject or inventory items stocked on a shelf or in a shopping store.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

A system and various implementations of the subject technology is described with reference to FIGS. 1-13. The system and processes are described with reference to FIG. 1, an architectural level schematic of a system in accordance with an implementation. Because FIG. 1 is an architectural diagram, certain details are omitted to improve the clarity of the description.

Figure 1:
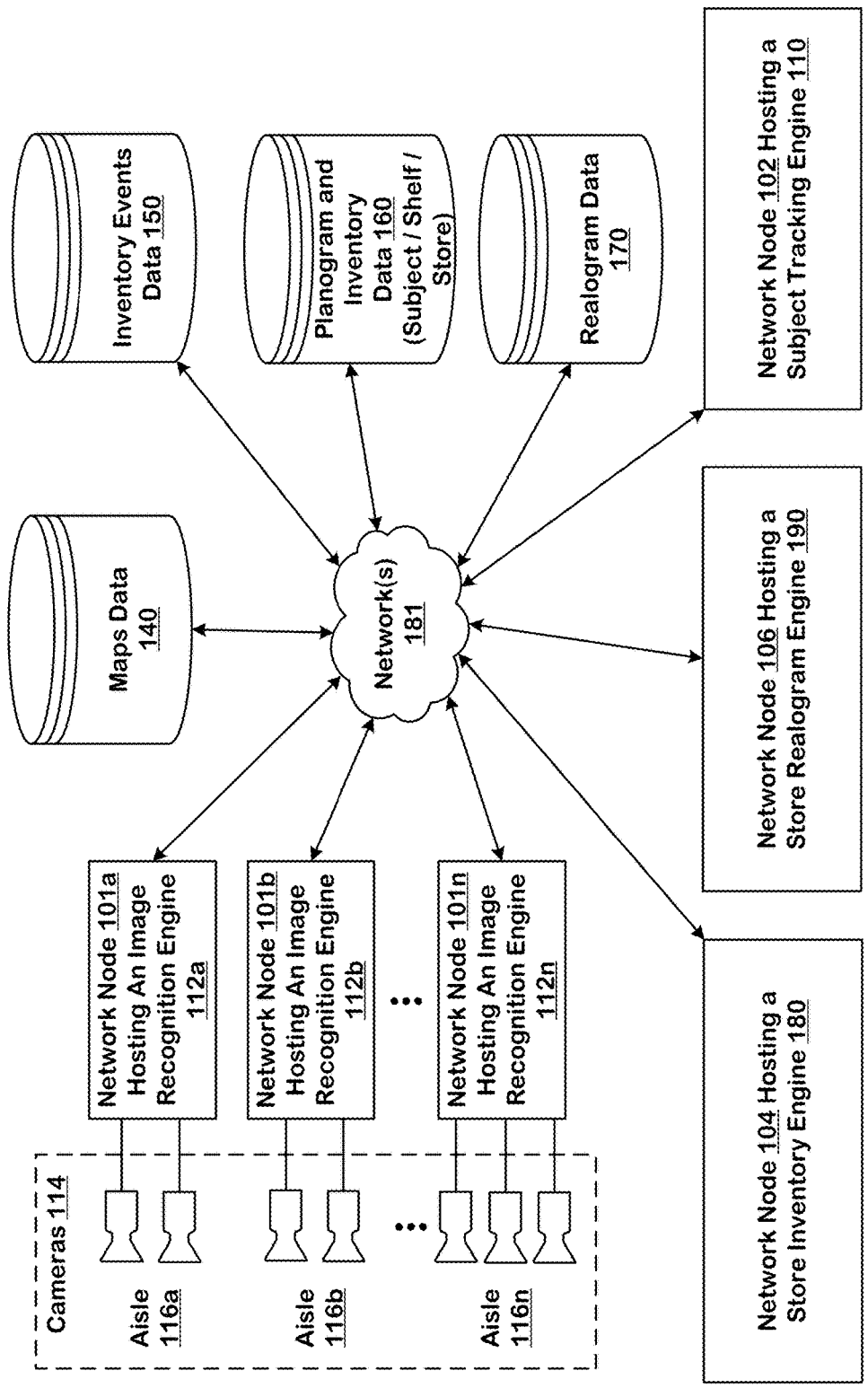
FIG. 1 illustrates an architectural level schematic of a system in which a store inventory engine and a store realogram engine track inventory items in an area of real space including inventory display structures.

The discussion of FIG. 1 is organized as follows. First, the elements of the system are described, followed by their interconnections. Then, the use of the elements in the system is described in greater detail.

FIG. 1 provides a block diagram level illustration of a system 100. The system 100 includes cameras 114, network nodes hosting image recognition engines 112a, 112b, and 112n, a store inventory engine 180 deployed in a network node 104 (or nodes) on the network, a store realogram engine 190 deployed in a network node 106 (or nodes) on the network, a network node 102 hosting a subject tracking engine 110, a maps database 140, an inventory events database 150, a planogram and inventory database 160, a realogram database 170, and a communication network or networks 181. The network nodes can host only one image recognition engine, or several image recognition engines. The system can also include a subject database and other supporting data.

As used herein, a network node is an addressable hardware device or virtual device that is attached to a network, and is capable of sending, receiving, or forwarding information over a communications channel to or from other network nodes. Examples of electronic devices which can be deployed as hardware network nodes include all varieties of computers, workstations, laptop computers, handheld computers, and smartphones. Network nodes can be implemented in a cloud-based server system. More than one virtual device configured as a network node can be implemented using a single physical device.

For the sake of clarity, only three network nodes hosting image recognition engines are shown in the system 100. However, any number of network nodes hosting image recognition engines can be connected to the subject tracking engine 110 through the network(s) 181. Similarly, the image recognition engine, the subject tracking engine, the store inventory engine, the store realogram engine and other processing engines described herein can execute using more than one network node in a distributed architecture.

The interconnection of the elements of system 100 will now be described. Network(s) 181 couples the network nodes 101a, 101b, and 101n, respectively, hosting image recognition engines 112a, 112b, and 112n, the network node 104 hosting the store inventory engine 180, the network node 106 hosting the store realogram engine 190, the network node 102 hosting the subject tracking engine 110, the maps database 140, the inventory events database 150, the inventory database 160, and the realogram database 170. Cameras 114 are connected to the subject tracking engine 110 through network nodes hosting image recognition engines 112a, 112b, and 112n. In one embodiment, the cameras 114 are installed in a shopping store such that sets of cameras 114 (two or more) with overlapping fields of view are positioned over each aisle to capture images of real space in the store. In FIG. 1, two cameras are arranged over aisle 116a, two cameras are arranged over aisle 116b, and three cameras are arranged over aisle 116n. The cameras 114 are installed over aisles with overlapping fields of view. In such an embodiment, the cameras are configured with the goal that customers moving in the aisles of the shopping store are present in the field of view of two or more cameras at any moment in time.

Cameras 114 can be synchronized in time with each other, so that images are captured at the same time, or close in time, and at the same image capture rate. The cameras 114 can send respective continuous streams of images at a predetermined rate to network nodes hosting image recognition engines 112a-112n. Images captured in all the cameras covering an area of real space at the same time, or close in time, are synchronized in the sense that the synchronized images can be identified in the processing engines as representing different views of subjects having fixed positions in the real space. For example, in one embodiment, the cameras send image frames at the rates of 30 frames per second (fps) to respective network nodes hosting image recognition engines 112a-112n. Each frame has a timestamp, identity of the camera (abbreviated as "camera_id"), and a frame identity (abbreviated as "frame_id") along with the image data. Other embodiments of the technology disclosed can use different types of sensors such as infrared image sensors, RF image sensors, ultrasound sensors, thermal sensors, Lidars, etc., to generate this data. Multiple types of sensors can be used, including for example ultrasound or RF sensors in addition to the cameras 114 that generate RGB color output. Multiple sensors can be synchronized in time with each other, so that frames are captured by the sensors at the same time, or close in time, and at the same frame capture rate. In all of the embodiments described herein sensors other than cameras, or sensors of multiple types, can be used to produce the sequences of images utilized.

Cameras installed over an aisle are connected to respective image recognition engines. For example, in FIG. 1, the two cameras installed over the aisle 116a are connected to the network node 101a hosting an image recognition engine 112a. Likewise, the two cameras installed over aisle 116b are connected to the network node 101b hosting an image recognition engine 112b. Each image recognition engine 112a-112n, hosted in a network node or nodes 101a-101n, separately processes the image frames received from one camera each in the illustrated example.

In one embodiment, each image recognition engine 112a, 112b, and 112n, is implemented as a deep learning algorithm such as a convolutional neural network (abbreviated CNN). In such an embodiment, the CNN is trained using training database. In an embodiment described herein, image recognition of subjects in the real space is based on identifying and grouping joints recognizable in the images, where the groups of joints can be attributed to an individual subject. For this joints-based analysis, the training database has a large collection of images for each of the different types of joints for subjects. In the example embodiment of a shopping store, the subjects are the customers moving in the aisles between the shelves. In an example embodiment, during training of the CNN, the system 100 is referred to as a "training system." After training the CNN using the training database, the CNN is switched to production mode to process images of customers in the shopping store in real time.

In an example embodiment, during production, the system 100 is referred to as a runtime system (also referred to as an inference system). The CNN in each image recognition engine produces arrays of joints data structures for images in its respective stream of images. In an embodiment as described herein, an array of joints data structures is produced for each processed image, so that each image recognition engine 112a-112n, produces an output stream of arrays of joints data structures. These arrays of joints data structures from cameras having overlapping fields of view are further processed to form groups of joints, and to identify such groups of joints as subjects. The subjects can be identified and tracked by the system using an identifier "subject_id" during their presence in the area of real space.

The subject tracking engine 110, hosted on the network node 102 receives, in this example, continuous streams of arrays of joints data structures for the subjects from image recognition engines 112a-112n. The subject tracking engine 110 processes the arrays of joints data structures and translates the coordinates of the elements in the arrays of joints data structures corresponding to images in different sequences into candidate joints having coordinates in the real space. For each set of synchronized images, the combination of candidate joints identified throughout the real space can be considered, for the purposes of analogy, to be like a galaxy of candidate joints. For each succeeding point in time, movement of the candidate joints is recorded so that the galaxy changes over time. The output of the subject tracking engine 110 identifies subjects in the area of real space at a moment in time.

The subject tracking engine 110 uses logic to identify groups or sets of candidate joints having coordinates in real space as subjects in the real space. For the purposes of analogy, each set of candidate points is like a constellation of candidate joints at each point in time. The constellations of candidate joints can move over time. A time sequence analysis of the output of the subject tracking engine 110 over a period of time identifies movements of subjects in the area of real space.

In an example embodiment, the logic to identify sets of candidate joints comprises heuristic functions based on physical relationships amongst joints of subjects in real space. These heuristic functions are used to identify sets of candidate joints as subjects. The sets of candidate joints comprise individual candidate joints that have relationships according to the heuristic parameters with other individual candidate joints and subsets of candidate joints in a given set that has been identified, or can be identified, as an individual subject.

In the example of a shopping store the customers (also referred to as subjects above) move in the aisles and in open spaces. The customers take items from inventory locations on shelves in inventory display structures. In one example of inventory display structures, shelves are arranged at different levels (or heights) from the floor and inventory items are stocked on the shelves. The shelves can be fixed to a wall or placed as freestanding shelves forming aisles in the shopping store. Other examples of inventory display structures include, pegboard shelves, magazine shelves, lazy susan shelves, warehouse shelves, and refrigerated shelving units. The inventory items can also be stocked in other types of inventory display structures such as stacking wire baskets, dump bins, etc. The customers can also put items back on the same shelves from where they were taken or on another shelf.

The system includes the store inventory engine 180 (hosted on the network node 104) to update the inventory in inventory locations in the shopping store as customers put and take items from the shelves. The store inventory engine updates the inventory data structure of the inventory locations by indicating the identifiers (such as stock keeping units or SKUs) of inventory items placed on the inventory location. The inventory consolidation engine also updates the inventory data structure of the shopping store by updating their quantities stocked in the store. The inventory locations and store inventory data along with the customer's inventory data (also referred to as log data structure of inventory items or shopping cart data structure) are stored in the inventory database 160.

The store inventory engine 180 provides a status of the inventory items in inventory locations. It is difficult to determine at any moment in time, however, which inventory items are placed on what portion of the shelf. This is important information for the shopping store management and employees. The inventory items can be arranged in inventory locations according to a planogram which identifies the shelves and locations on the shelf where the inventory items are planned to be stocked. For example, a ketchup bottle may be stocked on a predetermined left portion of all shelves in an inventory display structure forming a columnwise arrangement. With the passage of time, customers take ketchup bottles from the shelves and place in their respective baskets or shopping carts. Some customers may put the ketchup bottles back on another portion of the same shelf in the same inventory display structure. The customers may also put back the ketchup bottles on shelves in other inventory display structures in the shopping store. The store realogram engine 190 (hosted on the network node 106) generates a realogram, which can be used to identify portions of shelves where the ketchup bottles are positioned at a time "t". This information can be used by the system to generate notifications to employees with locations of misplaced ketchup bottles.

Also, this information can be used across the inventory items in the area of real space to generate a data structure, referred to as a realogram herein, that tracks locations in time of the inventory items in the area of real space. The realogram of the shopping store generated by the store realogram engine 190 reflecting the current status of inventory items, and in some embodiments, reflecting the status of inventory items at a specified times "t" over an interval of time, can be saved in the realogram database 170.

The actual communication path to the network nodes 104 hosting the store inventory engine 170 and the network node 106 hosting the store realogram engine 190 through the network 181 can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as a LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and Yahoo! S4™.

Camera Arrangement

The cameras 114 are arranged to track multi-joint subjects (or entities) in a three dimensional (abbreviated as 3D) real space. In the example embodiment of the shopping store, the real space can include the area of the shopping store where items for sale are stacked in shelves. A point in the real space can be represented by an (x, y, z) coordinate system. Each point in the area of real space for which the system is deployed is covered by the fields of view of two or more cameras 114.

In a shopping store, the shelves and other inventory display structures can be arranged in a variety of manners, such as along the walls of the shopping store, or in rows forming aisles or a combination of the two arrangements. FIG. 2A shows an arrangement of shelf unit A 202 and shelf unit B 204, forming an aisle 116a, viewed from one end of the aisle 116a. Two cameras, camera A 206 and camera B 208 are positioned over the aisle 116a at a predetermined distance from a roof 230 and a floor 220 of the shopping store above the inventory display structures, such as shelf units A 202 and shelf unit B 204. The cameras 114 comprise cameras disposed over and having fields of view encompassing respective parts of the inventory display structures and floor area in the real space. The field of view 216 of the camera A 206 and the field of view 218 of the camera B 208 overlap with each other as shown in the FIG. 2A. The coordinates in real space of members of a set of candidate joints, identified as a subject, identify locations of the subject in the floor area.

In the example embodiment of the shopping store, the real space can include all of the floor 220 in the shopping store.

Figure 2B:
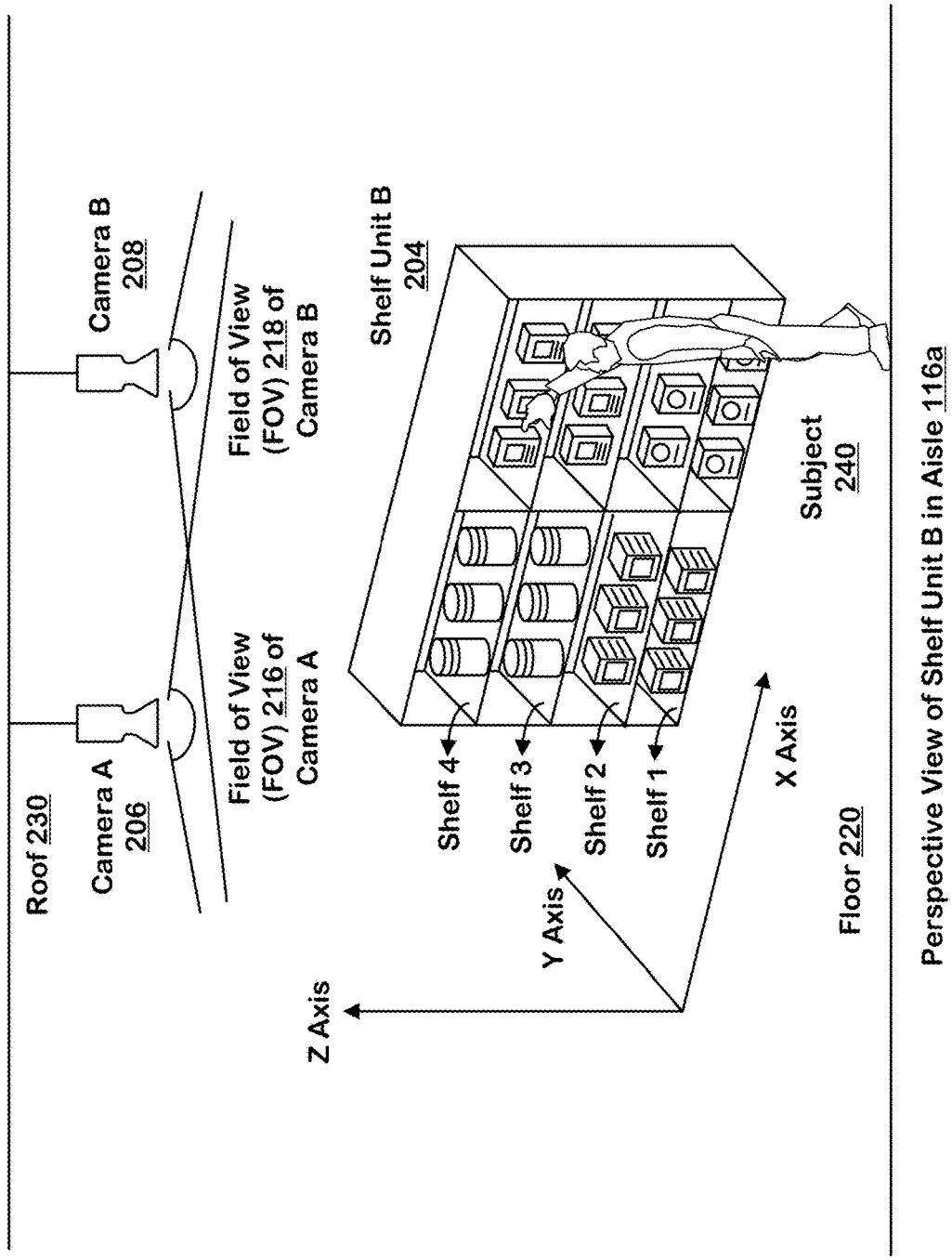
FIG. 2B is a perspective view of an inventory display structure in the aisle in FIG. 2A, illustrating a subject taking an item from a shelf in the inventory display structure.

Cameras 114 are placed and oriented such that areas of the floor 220 and shelves can be seen by at least two cameras. The cameras 114 also cover floor space in front of the shelves 202 and 204. Camera angles are selected to have both steep perspective, straight down, and angled perspectives that give more full body images of the customers. In one example embodiment, the cameras 114 are configured at an eight (8) foot height or higher throughout the shopping store. FIG. 13 presents an illustration of such an embodiment In FIG. 2A, a subject 240 is standing by an inventory display structure shelf unit B 204, with one hand positioned close to a shelf (not visible) in the shelf unit B 204. FIG. 2B is a perspective view of the shelf unit B 204 with four shelves, shelf 1, shelf 2, shelf 3, and shelf 4 positioned at different levels from the floor. The inventory items are stocked on the shelves.

Three Dimensional Scene Generation

A location in the real space is represented as a (x, y, z) point of the real space coordinate system. "x" and "y" represent positions on a two-dimensional (2D) plane which can be the floor 220 of the shopping store. The value "z" is the height of the point above the 2D plane at floor 220 in one configuration. The system combines 2D images from two or more cameras to generate the three dimensional positions of joints and inventory events (puts and takes of items from shelves) in the area of real space. This section presents a description of the process to generate 3D coordinates of joints and inventory events. The process is also referred to as 3D scene generation.

Before using the system 100 in training or inference mode to track the inventory items, two types of camera calibrations: internal and external, are performed. In internal calibration, the internal parameters of the cameras 114 are calibrated. Examples of internal camera parameters include focal length, principal point, skew, fisheye coefficients, etc. A variety of techniques for internal camera calibration can be used. One such technique is presented by Zhang in "A flexible new technique for camera calibration" published in IEEE Transactions on Pattern Analysis and Machine Intelligence, Volume 22, No. 11, November 2000.

In external calibration, the external camera parameters are calibrated in order to generate mapping parameters for translating the 2D image data into 3D coordinates in real space. In one embodiment, one multi joint subject, such as a person, is introduced into the real space. The multi-joint subject moves through the real space on a path that passes through the field of view of each of the cameras 114. At any given point in the real space, the multi-joint subject is present in the fields of view of at least two cameras forming a 3D scene. The two cameras, however, have a different view of the same 3D scene in their respective two-dimensional (2D) image planes. A feature in the 3D scene such as a left-wrist of the multi joint subject is viewed by two cameras at different positions in their respective 2D image planes.

A point correspondence is established between every pair of cameras with overlapping fields of view for a given scene. Since each camera has a different view of the same 3D scene, a point correspondence is two pixel locations (one location from each camera with overlapping field of view) that represent the projection of the same point in the 3D scene. Many point correspondences are identified for each 3D scene using the results of the image recognition engines 112a to 112n, for the purposes of the external calibration. The image recognition engines identify the position of a joint as (x, y) coordinates, such as row and column numbers, of pixels in the 2D image planes of respective cameras 114.

In one embodiment, a joint is one of 19 different types of joints of the multi-joint subject. As the multi-joint subject moves through the fields of view of different cameras, the tracking engine 110 receives (x, y) coordinates of each of the 19 different types of joints of the multi-joint subject used for the calibration from cameras 114 per image.

For example, consider an image from a camera A and an image from a camera B both taken at the same moment in time and with overlapping fields of view. There are pixels in an image from camera A that correspond to pixels in a synchronized image from camera B. Consider that there is a specific point of some object or surface in view of both camera A and camera B and that point is captured in a pixel of both image frames. In external camera calibration, a multitude of such points are identified and referred to as corresponding points. Since there is one multi-joint subject in the field of view of camera A and camera B during calibration, key joints of this multi-joint subject are identified, for example, the center of left wrist. If these key joints are visible in image frames from both camera A and camera B then it is assumed that these represent corresponding points. This process is repeated for many image frames to build up a large collection of corresponding points for all pairs of cameras with overlapping fields of view. In one embodiment, images are streamed off of all cameras at a rate of 30 FPS (frames per second) or more and a resolution of 720 pixels in full RGB (red, green, and blue) color. These images are in the form of one-dimensional arrays (also referred to as flat arrays).

The large number of images collected above for a multi joint subject are used to determine corresponding points between cameras with overlapping fields of view. Consider two cameras A and B with overlapping field of view. The plane passing through camera centers of cameras A and B and the joint location (also referred to as feature point) in the 3D scene is called the "epipolar plane". The intersection of the epipolar plane with the 2D image planes of the cameras A and B defines the "epipolar line". Given these corresponding points, a transformation is determined that can accurately map a corresponding point from camera A to an epipolar line in camera B's field of view that is guaranteed to intersect the corresponding point in the image frame of camera B. Using the image frames collected above for a multi joint subject, the transformation is generated. It is known in the art that this transformation is non-linear. The general form is furthermore known to require compensation for the radial distortion of each camera's lens, as well as the non-linear coordinate transformation moving to and from the projected space. In external camera calibration, an approximation to the ideal non-linear transformation is determined by solving a non-linear optimization problem. This non-linear optimization function is used by the subject tracking engine 110 to identify the same joints in outputs (arrays of joint data structures) of different image recognition engines 112a to 112n, processing images of cameras 114 with overlapping fields of view. The results of the internal and external camera calibration are stored in the calibration database 170.

A variety of techniques for determining the relative positions of the points in images of cameras 114 in the real space can be used. For example, Longuet-Higgins published, "A computer algorithm for reconstructing a scene from two projections" in Nature, Volume 293, 10 September 1981. This paper presents computing a three-dimensional structure of a scene from a correlated pair of perspective projections when spatial relationship between the two projections is unknown. Longuet-Higgins paper presents a technique to determine the position of each camera in the real space with respect to other cameras. Additionally, their technique allows triangulation of a multi-joint subject in the real space, identifying the value of the z-coordinate (height from the floor) using images from cameras 114 with overlapping fields of view. An arbitrary point in the real space, for example, the end of a shelf unit in one corner of the real space, is designated as a (0, 0, 0) point on the (x, y, z) coordinate system of the real space.

In an embodiment of the technology, the parameters of the external calibration are stored in two data structures. The first data structure stores intrinsic parameters. The intrinsic parameters represent a projective transformation from the 3D coordinates into 2D image coordinates. The first data structure contains intrinsic parameters per camera as shown below. The data values are all numeric floating point numbers. This data structure stores a 3×3 intrinsic matrix, represented as "K" and distortion coefficients. The distortion coefficients include six radial distortion coefficients and two tangential distortion coefficients. Radial distortion occurs when light rays bend more near the edges of a lens than they do at its optical center. Tangential distortion occurs when the lens and the image plane are not parallel. The following data structure shows values for the first camera only. Similar data is stored for all the cameras 114.

```
{
    1: {
        K: [[x, x, x], [x, x, x], [x, x, x]],
        distortion_coefficients: [x, x, x, x, x, x, x, x]
    },
}
```

The second data structure stores per pair of cameras: a 3×3 fundamental matrix (F), a 3×3 essential matrix (E), a 3×4 projection matrix (P), a 3×3 rotation matrix (R) and a 3×1 translation vector (t). This data is used to convert points in one camera's reference frame to another camera's reference frame. For each pair of cameras, eight homography coefficients are also stored to map the plane of the floor 220 from one camera to another. A fundamental matrix is a relationship between two images of the same scene that constrains where the projection of points from the scene can occur in both images. Essential matrix is also a relationship between two images of the same scene with the condition that the cameras are calibrated. The projection matrix gives a vector space projection from 3D real space to a subspace. The rotation matrix is used to perform a rotation in Euclidean space. Translation vector "t" represents a geometric transformation that moves every point of a figure or a space by the same distance in a given direction. The homography_floor_coefficients are used to combine images of features of subjects on the floor 220 viewed by cameras with overlapping fields of views. The second data structure is shown below. Similar data is stored for all pairs of cameras. As indicated previously, the x's represents numeric floating point numbers.

```
{
    1: {
        2: {
            F: [[x, x, x], [x, x, x], [x, x, x]],
            E: [[x, x, x], [x, x, x], [x, x, x]],
            P: [[x, x, x, x], [x, x, x, x], [x, x, x, x]],
            R: [[x, x, x], [x, x, x], [x, x, x]],
            t: [x, x, x],
```

-continued

```
            homography_floor_coefficients: [x, x, x, x, x, x, x, x]
        }
    },
    .......
}
```

Two Dimensional and Three Dimensional Maps

Figure 3:
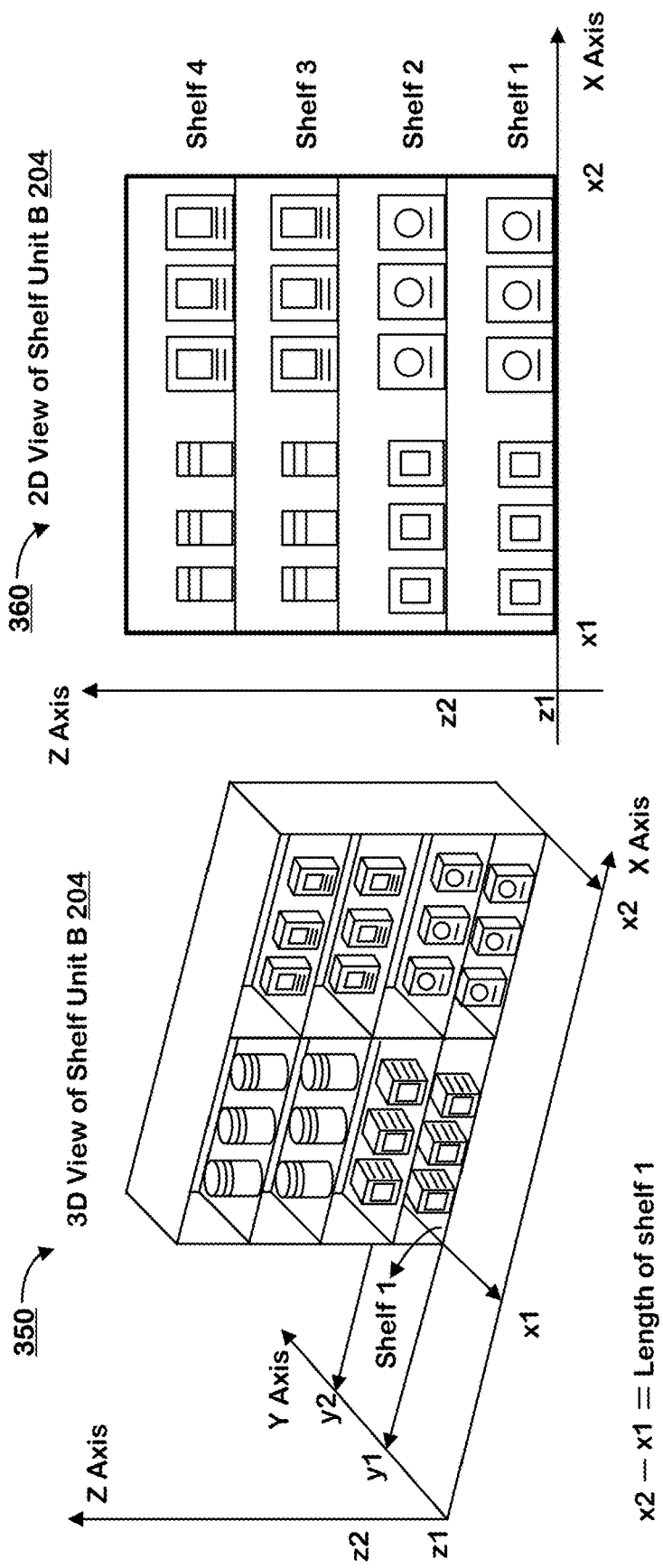
FIG. 3 shows examples of 2D and 3D maps of a shelf in an inventory display structure.

An inventory location, such as a shelf, in a shopping store can be identified by a unique identifier (e.g., shelf_id). Similarly, a shopping store can also be identified by a unique identifier (e.g., store_id). The two dimensional (2D) and three dimensional (3D) maps database 140 identifies inventory locations in the area of real space along the respective coordinates. For example, in a 2D map, the locations in the maps define two dimensional regions on the plane formed perpendicular to the floor 220 i.e., XZ plane as shown in FIG. 3. The map defines an area for inventory locations where inventory items are positioned. In FIG. 3, a 2D view 360 of shelf 1 in shelf unit B 204 shows an area formed by four coordinate positons (x1, z1), (x1, z2), (x2, z2), and (x2, z1) defines a 2D region in which inventory items are positioned on the shelf 1. Similar 2D areas are defined for all inventory locations in all shelf units (or other inventory display structures) in the shopping store. This information is stored in the maps database 140.

In a 3D map, the locations in the map define three dimensional regions in the 3D real space defined by X, Y, and Z coordinates. The map defines a volume for inventory locations where inventory items are positioned. In FIG. 3, a 3D view 350 of shelf 1 in shelf unit B 204 shows a volume formed by eight coordinate positions (x1, y1, z1), (x1, y1, z2), (x1, y2, z1), (x1, y2, z2), (x2, y1, z1), (x2, y1, z2), (x2, y2, z1), (x2, y2, z2) defines a 3D region in which inventory items are positioned on the shelf 1. Similar 3D regions are defined for inventory locations in all shelf units in the shopping store and stored as a 3D map of the real space (shopping store) in the maps database 140. The coordinate positions along the three axes can be used to calculate length, depth and height of the inventory locations as shown in FIG. 3.

In one embodiment, the map identifies a configuration of units of volume which correlate with portions of inventory locations on the inventory display structures in the area of real space. Each portion is defined by stating and ending positions along the three axes of the real space. Similar configuration of portions of inventory locations can also be generated using a 2D map of inventory locations dividing the front plan of the display structures.

Joints Data Structure

The image recognition engines 112a-112n, receive the sequences of images from cameras 114 and process images to generate corresponding arrays of joints data structures. The system includes processing logic that uses the sequences of images produced by the plurality of camera to track locations of a plurality of subjects (or customers in the shopping store) in the area of real space. In one embodiment, the image recognition engines 112a-112n, identify one of the 19 possible joints of a subject at each element of the image, usable to identify subjects in the area who may be taking and putting inventory items. The possible joints can be grouped in two categories: foot joints and non-foot joints. The $19^{th}$ type of joint classification is for all non-joint features of the subject (i.e. elements of the image not classified as a joint). In other embodiments, the image recognition engine may be configured to identify the locations of hands specifically. Also, other techniques, such as a user check-in procedure or biometric identification processes, may be deployed for the purposes of identifying the subjects and linking the subjects with detected locations of their hands as they move throughout the store.

Foot Joints:
  Ankle joint (left and right)
Non-foot Joints:
  Neck
  Nose
  Eyes (left and right)
  Ears (left and right)
  Shoulders (left and right)
  Elbows (left and right)
  Wrists (left and right)
  Hip (left and right)
  Knees (left and right)
Not a joint An array of joints data structures for a particular image classifies elements of the particular image by joint type, time of the particular image, and the coordinates of the elements in the particular image. In one embodiment, the image recognition engines 112a-112n, are convolutional neural networks (CNN), the joint type is one of the 19 types of joints of the subjects, the time of the particular image is the timestamp of the image generated by the source camera 114 for the particular image, and the coordinates (x, y) identify the position of the element on a 2D image plane.

The output of the CNN is a matrix of confidence arrays for each image per camera. The matrix of confidence arrays is transformed into an array of joints data structures. A joints data structure 400 as shown in FIG. 4 is used to store the information of each joint. The joints data structure 400 identifies x and y positions of the element in the particular image in the 2D image space of the camera from which the image is received. A joint number identifies the type of joint identified. For example, in one embodiment, the values range from 1 to 19. A value of 1 indicates that the joint is a left ankle, a value of 2 indicates the joint is a right ankle and so on. The type of joint is selected using the confidence array for that element in the output matrix of CNN. For example, in one embodiment, if the value corresponding to the left-ankle joint is highest in the confidence array for that image element, then the value of the joint number is "1".

A confidence number indicates the degree of confidence of the CNN in predicting that joint. If the value of confidence number is high, it means the CNN is confident in its prediction. An integer-Id is assigned to the joints data structure to uniquely identify it. Following the above mapping, the output matrix of confidence arrays per image is converted into an array of joints data structures for each image. In one embodiment, the joints analysis includes performing a combination of k-nearest neighbors, mixture of Gaussians, and various image morphology transformations on each input image. The result comprises arrays of joints data structures which can be stored in the form of a bit mask in a ring buffer that maps image numbers to bit masks at each moment in time.

Subject Tracking Engine

The tracking engine 110 is configured to receive arrays of joints data structures generated by the image recognition engines 112a-112n, corresponding to images in sequences of images from cameras having overlapping fields of view. The arrays of joints data structures per image are sent by image recognition engines 112a-112n, to the tracking engine 110 via the network(s) 181. The tracking engine 110 translates the coordinates of the elements in the arrays of joints data structures corresponding to images in different sequences into candidate joints having coordinates in the real space. A location in the real space is covered by the field of views of two or more cameras. The tracking engine 110 comprises logic to identify sets of candidate joints having coordinates in real space (constellations of joints) as subjects in the real space. In one embodiment, the tracking engine 110 accumulates arrays of joints data structures from the image recognition engines for all the cameras at a given moment in time and stores this information as a dictionary in a subject database, to be used for identifying a constellation of candidate joints. The dictionary can be arranged in the form of key-value pairs, where keys are camera ids and values are arrays of joints data structures from the camera. In such an embodiment, this dictionary is used in heuristics-based analysis to determine candidate joints and for assignment of joints to subjects. In such an embodiment, a high-level input, processing and output of the tracking engine 110 is illustrated in table 1. Details of the logic applied by the subject tracking engine 110 to create subjects by combining candidate joints and track movement of subjects in the area of real space are presented in U.S. Pat. No. 10,055,853, issued 21 Aug. 2018, titled, "Subject Identification and Tracking Using Image Recognition Engine" which is incorporated herein by reference.

TABLE 1

Inputs, processing and outputs from subject tracking engine 110 in an example embodiment.

| Inputs | Processing | Output |
| --- | --- | --- |
| Arrays of joints data structures per image and for each joints data structure Unique ID Confidence number Joint number (x, y) position in image space | Create joints dictionary Reproject joint positions in the fields of view of cameras with overlapping fields of view to candidate joints | List of identified subjects in the real space at a moment in time |

Subject Data Structure

The subject tracking engine 110 uses heuristics to connect joints of subjects identified by the image recognition engines 112a-112n. In doing so, the subject tracking engine 110 creates new subjects and updates the locations of existing subjects by updating their respective joint locations. The subject tracking engine 110 uses triangulation techniques to project the locations of joints from 2D space coordinates (x, y) to 3D real space coordinates (x, y, z). FIG. 5 shows the subject data structure 500 used to store the subject. The subject data structure 500 stores the subject related data as a key-value dictionary. The key is a "frame_id" and the value is another key-value dictionary where key is the camera_id and value is a list of 18 joints (of the subject) with their locations in the real space. The subject data is stored in the subject database. Every new subject is also assigned a unique identifier that is used to access the subject's data in the subject database.

In one embodiment, the system identifies joints of a subject and creates a skeleton of the subject. The skeleton is projected into the real space indicating the position and orientation of the subject in the real space. This is also referred to as "pose estimation" in the field of machine vision. In one embodiment, the system displays orientations and positions of subjects in the real space on a graphical user interface (GUI). In one embodiment, the subject identification and image analysis are anonymous, i.e., a unique identifier assigned to a subject created through joints analysis does not identify personal identification information of the subject as described above.

For this embodiment, the joints constellation of an identified subject, produced by time sequence analysis of the joints data structures, can be used to locate the hand of the subject. For example, the location of a wrist joint alone, or a location based on a projection of a combination of a wrist joint with an elbow joint, can be used to identify the location of hand of an identified subject.

Inventory Events

Figure 6:
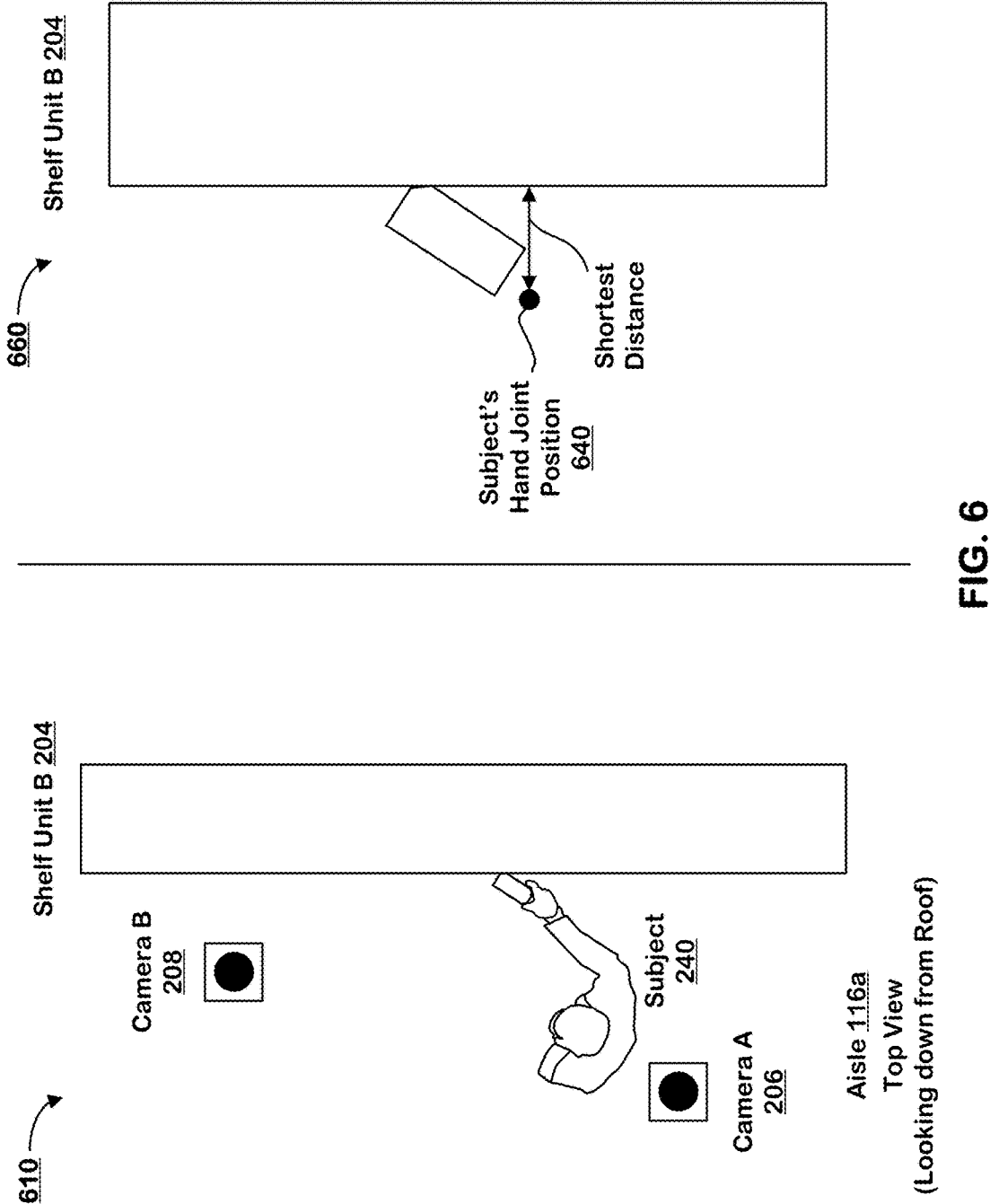
FIG. 6 is a top view of the inventory display structure of a shelf unit in the aisle of FIG. 2A in a shopping store illustrating selection of a shelf in an inventory display structure based on location of an inventory event indicating an item taken from the shelf.

FIG. 6 shows the subject 240 taking an inventory item from a shelf in the shelf unit B 204 in a top view 610 of the aisle 116a. The technology disclosed uses the sequences of images produced by at least two cameras in the plurality of cameras to find a location of an inventory event. Joints of a single subject can appear in image frames of multiple cameras in a respective image channel. In the example of a shopping store, the subjects move in the area of real space and take items from inventory locations and also put items back on the inventory locations. In one embodiment the system predicts inventory events (put or take, also referred to as plus or minus events) using a pipeline of convolutional neural networks referred to as WhatCNN and WhenCNN.

The data sets comprising subjects identified by joints in subject data structures 500 and corresponding image frames from sequences of image frames per camera are given as input to a bounding box generator. The bounding box generator implements the logic to process the data sets to specify bounding boxes which include images of hands of identified subjects in images in the sequences of images. The bounding box generator identifies locations of hands in each source image frame per camera using for example, locations of wrist joints (for respective hands) and elbow joints in the multi-joints data structures 500 corresponding to the respective source image frame. In one embodiment, in which the coordinates of the joints in subject data structure indicate location of joints in 3D real space coordinates, the bounding box generator maps the joint locations from 3D real space coordinates to 2D coordinates in the image frames of respective source images.

The bounding box generator creates bounding boxes for hands in image frames in a circular buffer per camera 114. In one embodiment, the bounding box is a 128 pixels (width) by 128 pixels (height) portion of the image frame with the hand located in the center of the bounding box. In other embodiments, the size of the bounding box is 64 pixels×64 pixels or 32 pixels×32 pixels. Form subjects in an image frame from a camera, there can be a maximum of 2 m hands, thus 2 m bounding boxes. However, in practice fewer than 2 m hands are visible in an image frame because of occlusions due to other subjects or other objects. In one example embodiment, the hand locations of subjects are inferred from locations of elbow and wrist joints. For example, the right hand location of a subject is extrapolated using the location of the right elbow (identified as p1) and the right wrist (identified as p2) as extrapolation_amount*(p2−p1)+ p2 where extrapolation_amount equals 0.4. In another embodiment, the joints CNN 112a-112n, are trained using left and right hand images. Therefore, in such an embodiment, the joints CNN 112a-112n, directly identify locations of hands in image frames per camera. The hand locations per image frame are used by the bounding box generator to create a bounding box per identified hand.

WhatCNN is a convolutional neural network trained to process the specified bounding boxes in the images to generate a classification of hands of the identified subjects.

One trained WhatCNN processes image frames from one camera. In the example embodiment of the shopping store, for each hand in each image frame, the WhatCNN identifies whether the hand is empty. The WhatCNN also identifies a SKU (stock keeping unit) number of the inventory item in the hand, a confidence value indicating the item in the hand is a non-SKU item (i.e. it does not belong to the shopping store inventory) and a context of the hand location in the image frame.

The outputs of WhatCNN models for all cameras 114 are processed by a single WhenCNN model for a pre-determined window of time. In the example of a shopping store, the WhenCNN performs time series analysis for both hands of subjects to identify whether a subject took a store inventory item from a shelf or put a store inventory item on a shelf. The technology disclosed uses the sequences of images produced by at least two cameras in the plurality of cameras to find a location of an inventory event. The WhenCNN executes analysis of data sets from sequences of images from at least two cameras to determine locations of inventory events in three dimensions and to identify item associated with the inventory event. A time series analysis of the output of WhenCNN per subject over a period of time is performed to identify inventory events and their time of occurrence. A non-maximum suppression (NMS) algorithm is used for this purpose. As one inventory event (i.e. put or take of an item by a subject) is detected by WhenCNN multiple times (both from the same camera and from multiple cameras), the NMS removes superfluous events for a subject. NMS is a rescoring technique comprising two main tasks: "matching loss" that penalizes superfluous detections and "joint processing" of neighbors to know if there is a better detection close-by.

The true events of takes and puts for each subject are further processed by calculating an average of the SKU logits for 30 image frames prior to the image frame with the true event. Finally, the arguments of the maxima (abbreviated arg max or argmax) are used to determine the largest value. The inventory item classified by the argmax value is used to identify the inventory item put on the shelf or taken from the shelf. The technology disclosed attributes the inventory event to a subject by assigning the inventory item associated with the inventory to a log data structure (or shopping cart data structure) of the subject. The inventory item is added to a log of SKUs (also referred to as shopping cart or basket) of respective subjects. The image frame identifier "frame_id," of the image frame which resulted in the inventory event detection is also stored with the identified SKU. The logic to attribute the inventory event to the customer matches the location of the inventory event to a location of one of the customers in the plurality of customers. For example, the image frame can be used to identify 3D position of the inventory event, represented by the position of the subject's hand in at least one point of time during the sequence that is classified as an inventory event using the subject data structure 500, which can be then used to determine the inventory location from where the item was taken from or put on. The technology disclosed uses the sequences of images produced by at least two cameras in the plurality of cameras to find a location of an inventory event and creates an inventory event data structure. In one embodiment, the inventory event data structure stores item identifier, a put or take indicator, coordinates in three dimensions of the area of real space and a time stamp. In one embodiment, the inventory events are stored in the inventory events database 150.

The locations of inventory events (puts and takes of inventory items by subjects in an area of space) can be compared with a planogram or other map of the store to identify an inventory location, such as a shelf, from which the subject has taken the item or placed the item on. An illustration 660 shows the determination of a shelf in a shelf unit by calculating a shortest distance from the position of the hand 640 associated with the inventory event. This determination of shelf is then used to update the inventory data structure of the shelf. An example inventory data structure 700 (also referred to as a log data structure) shown in FIG. 7. This inventory data structure stores the inventory of a subject, shelf or a store as a key-value dictionary. The key is the unique identifier of a subject, shelf or a store and the value is another key value-value dictionary where key is the item identifier such as a stock keeping unit (SKU) and the value is a number identifying the quantity of item along with the "frame_id" of the image frame that resulted in the inventory event prediction. The frame identifier ("frame_id") can be used to identify the image frame which resulted in identification of an inventory event resulting in association of the inventory item with the subject, shelf, or the store. In other embodiments, a "camera_id" identifying the source camera can also be stored in combination with the frame_id in the inventory data structure 700. In one embodiment, the "frame_id" is the subject identifier because the frame has the subject's hand in the bounding box. In other embodiments, other types of identifiers can be used to identify subjects such as a "subject_id" which explicitly identifies a subject in the area of real space.

When the shelf inventory data structure is consolidated with the subject's log data structure, the shelf inventory is reduced to reflect the quantity of item taken by the customer from the shelf. If the item was put on the shelf by a customer or an employee stocking items on the shelf, the items get added to the respective inventory locations' inventory data structures. Over a period of time, this processing results in updates to the shelf inventory data structures for all inventory locations in the shopping store. Inventory data structures of inventory locations in the area of real space are consolidated to update the inventory data structure of the area of real space indicating the total number of items of each SKU in the store at that moment in time. In one embodiment, such updates are performed after each inventory event. In another embodiment, the store inventory data structures are updated periodically.

Detailed implementation of the implementations of WhatCNN and WhenCNN to detect inventory events is presented in U.S. patent application Ser. No. 15/907,112, filed 27 Feb. 2018, titled, "Item Put and Take Detection Using Image Recognition" which is incorporated herein by reference as if fully set forth herein.

Realtime Shelf and Store Inventory Update

Figure 8:
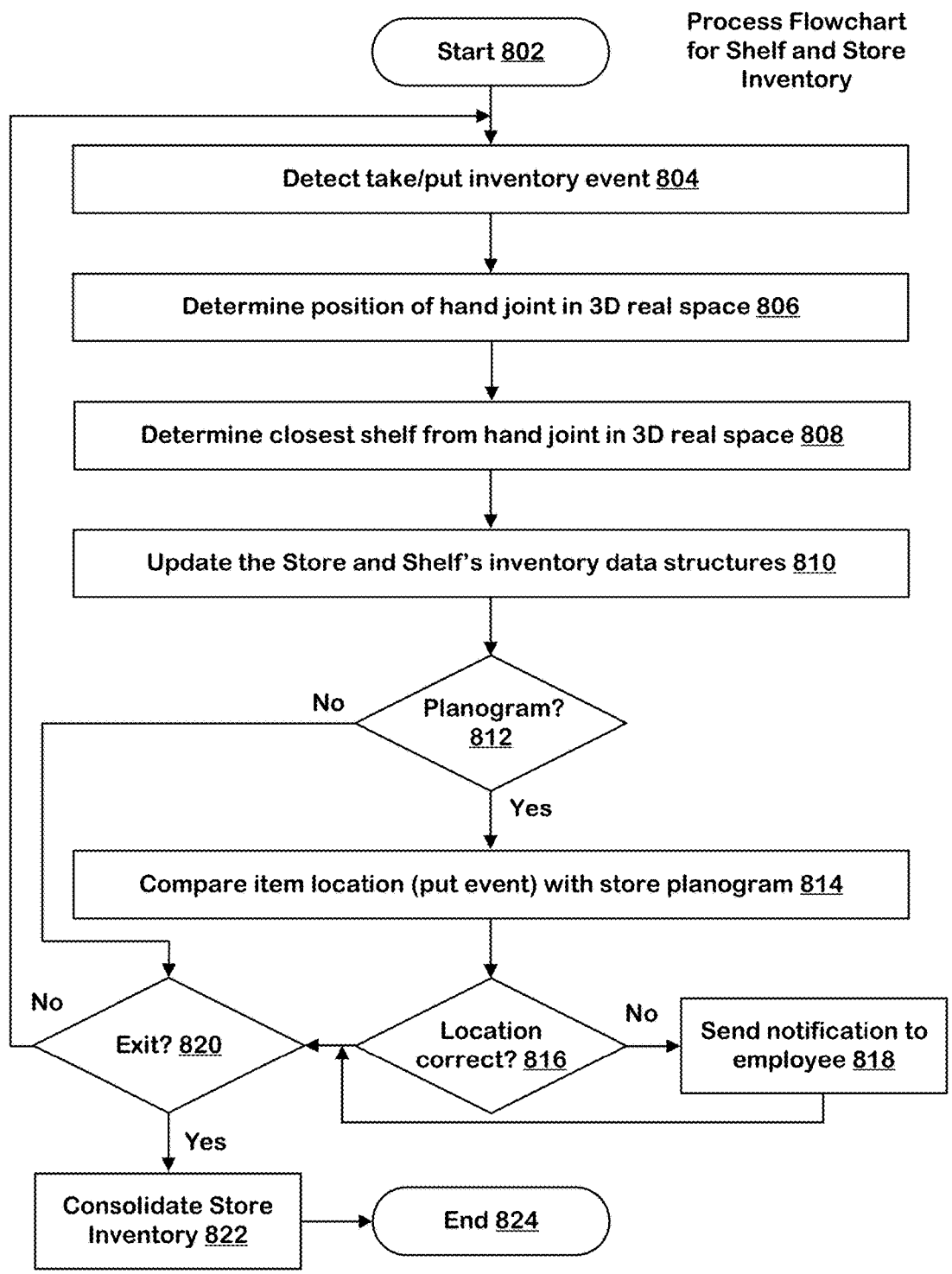
FIG. 8 is a flowchart showing process steps for determining inventory items on shelves and in a shopping store based on the locations of puts and takes of inventory items.

FIG. 8 is a flowchart presenting process steps for updating shelf inventory data structure in an area of real space. The process starts at step 802. At step 804, the system detects a take or a put event in the area of real space. The inventory event is stored in the inventory events database 150. The inventory event record includes an item identifier such as SKU, a timestamp, a location of the event in a three dimensional area of real space indicating the positions along the three dimensions x, y, and z. The inventory events also includes a put or a take indicator, identifying whether the subject has put the item on a shelf (also referred to as a plus inventory event) or taken the item from a shelf (also referred to as a minus inventory event). The inventory event information is combined with output from the subject tracking engine 110 to identify the subject associated with this inventory event. The result of this analysis is then used to update the log data structure (also referred to as a shopping cart data structure) of the subject in the inventory database 160. In one embodiment, a subject identifier (e.g., "subject_id") is stored in the inventory event data structure.

The system can use the location of the hand of the subject (step 806) associated with the inventory event to locate a nearest shelf in an inventory display structure (also referred to as a shelf unit above) at step 808. The store inventory engine 180 calculates distance of the hand to two dimensional (2D) regions or areas on xz planes (perpendicular to the floor 220) of inventory locations in the shopping store. The 2D regions of the inventory locations are stored in the map database 140 of the shopping store. Consider the hand is represented by a point E ($x_{event}$, $y_{event}$, $z_{event}$) in the real space. The shortest distance D from a point E in the real space to any point P on the plane can be determined by projecting the vector PE on a normal vector n to the plane. Existing mathematical techniques can be used to calculate the distance of the hand to all planes representing 2D regions of inventory locations.

In one embodiment, the technology disclosed matches location of the inventory event with an inventory location by executing a procedure including calculating a distance from the location of the inventory event to inventory locations on inventory display structures and matching the inventory event with an inventory location based on the calculated distance. For example, the inventory location (such as a shelf) with the shortest distance from the location of the inventory event is selected and this shelf's inventory data structure is updated at step 810. In one embodiment, the location of the inventory events is determined by position of the hand of the subject along three coordinates of the real space. If the inventory event is a take event (or a minus event) indicating a bottle of ketchup is taken by the subject, the shelf's inventory is updated by decreasing the number of ketchup bottles by one. Similarly, if the inventory event is a put event indicating a subject put a bottle of ketchup on the shelf, the shelf's inventory is updated by increasing the number of ketchup bottles by one. Similarly, the store's inventory data structure is also updated accordingly. The quantities of items put on the inventory locations are incremented by the same number in the store inventory data structure. Likewise, the quantities of items taken from the inventory locations are subtracted from the store's inventory data structure in the inventory database 160.

At step 812, it is checked if a planogram is available for the shopping store, or alternatively the planogram can be known to be available. A planogram is a data structure that maps inventory items to inventory locations in the shopping store, which can be based on a plan for distribution of inventory items in the store. If the planogram for the shopping store is available, the item put on the shelf by the subject is compared with the items on the shelf in the planogram at step 814. In one embodiment, the technology disclosed includes logic to determine misplaced items if the inventory event is matched with an inventory location that does not match the planogram. For example, if the SKU of the item associated with the inventory event matches distribution of inventory items in the inventory locations, the location of the item is correct (step 816), otherwise the item is misplaced. In one embodiment, a notification is sent to an employee in step 818 to take the misplaced item from the current inventory location (such as a shelf) and move it to its correct inventory location according to the planogram. The system checks if the subject is exiting the shopping store at step 820 by using the speed, orientation and proximity to the store exit. If the subject is not existing from the store (step 820), the process continues at step 804. Otherwise, if it is determined that the subject is exiting the store, the log data structure (or the shopping cart data structure) of the subject, and the store's inventory data structures are consolidated at step 822.

In one embodiment, the consolidation includes subtracting the items in subject's shopping cart data structure from the store inventory data structure if these items are not subtracted from the store inventory at the step 810. At this step, the system can also identify items in the shopping cart data structure of a subject that have low identification confidence scores and send a notification to a store employee positioned near the store exit. The employee can then confirm the items with low identification confidence scores in shopping cart of the customer. The process does not require the store employee to compare all items in the shopping cart of the customer with the customer's shopping cart data structure, only the item that has a low confidence score is identified by the system to the store employee which is then confirmed by the store employee. The process ends at step 824.

Architecture for Realtime Shelf and Store Inventory Update

Figure 9A:
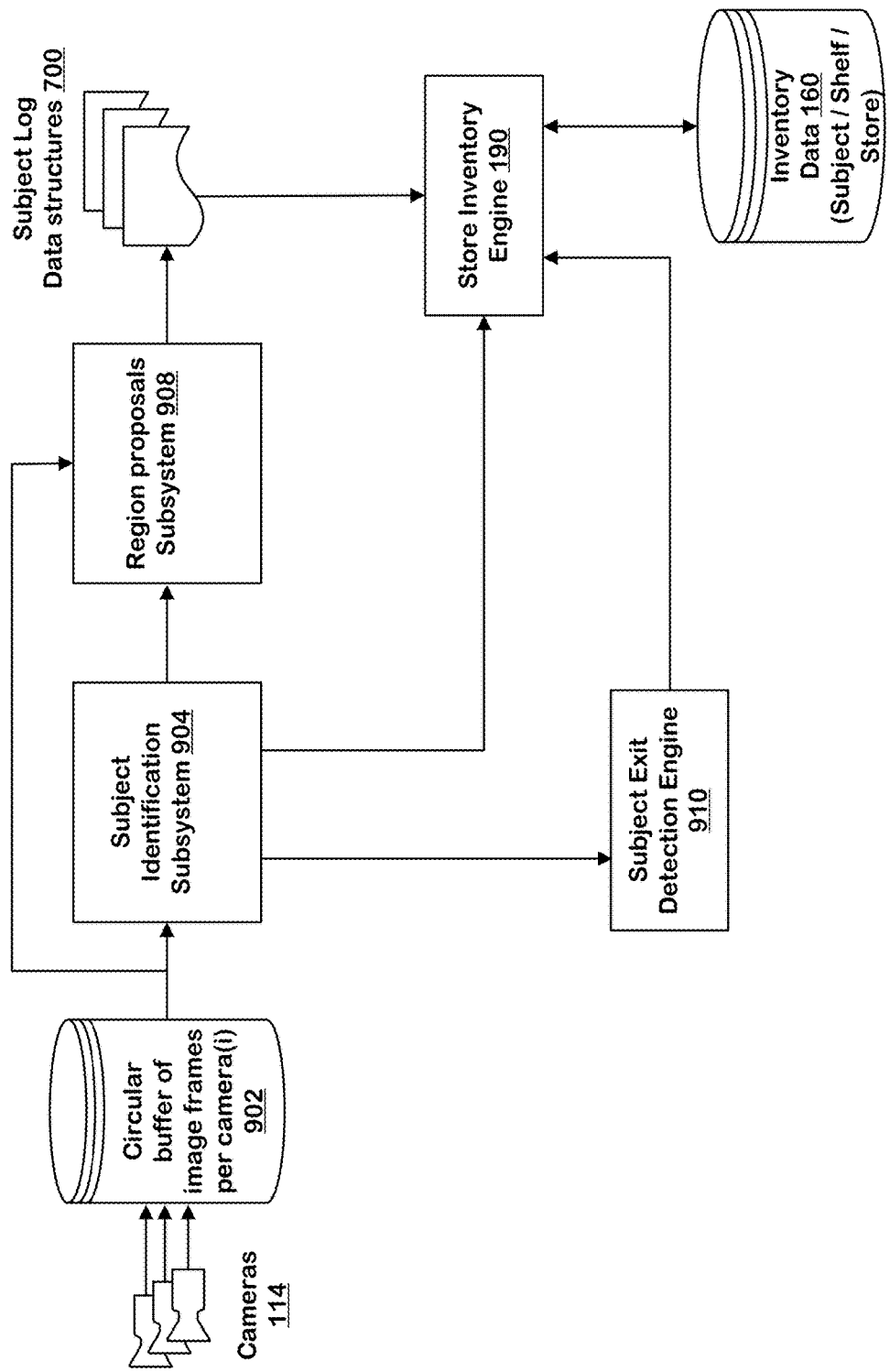
FIG. 9A is an example architecture in which the technique presented in the flowchart of FIG. 8 can be used to determine inventory items on shelves in an area of real space.

An example architecture of a system in which customer inventory, inventory location (e.g. shelf) inventory and the store inventory (e.g. store wide) data structures are updated using the puts and takes of items by customers in the shopping store is presented in FIG. 9A. Because FIG. 9A is an architectural diagram, certain details are omitted to improve the clarity of description. The system presented in FIG. 9A receives image frames from a plurality of cameras 114. As described above, in one embodiment, the cameras 114 can be synchronized in time with each other, so that images are captured at the same time, or close in time, and at the same image capture rate. Images captured in all the cameras covering an area of real space at the same time, or close in time, are synchronized in the sense that the synchronized images can be identified in the processing engines as representing different views at a moment in time of subjects having fixed positions in the real space. The images are stored in a circular buffer of image frames per camera 902.

A "subject identification" subsystem 904 (also referred to as first image processors) processes image frames received from cameras 114 to identify and track subjects in the real space. The first image processors include subject image recognition engines to detect joints of subjects in the area of real. The joints are combined to form subjects which are then tracked as the move in the area of real space. The subjects are anonymous and are tracked using an internal identifier "subject_id".

A "region proposals" subsystem 908 (also referred to as third image processors) includes foreground image recognition engines, receives corresponding sequences of images from the plurality of cameras 114, and recognizes semantically significant objects in the foreground (i.e. customers, their hands and inventory items) as they relate to puts and takes of inventory items, for example, over time in the images from each camera. The region proposals subsystem 908 also receives output of the subject identification subsystem 904. The third image processors process sequences of images from cameras 114 to identify and classify foreground changes represented in the images in the corresponding sequences of images. The third image processors process identified foreground changes to make a first set of detections of takes of inventory items by identified subjects and of puts of inventory items on inventory display structures by identified subjects. In one embodiment, the third image processors comprise convolutional neural network (CNN) models such as WhatCNNs described above. The first set of detections are also referred to as foreground detection of puts and takes of inventory items. In this embodiment, the outputs of WhatCNNs are processed a second convolutional neural network (WhenCNN) to make the first set of detections which identify put events of inventory items on inventory locations and take events of inventory items on inventory locations in inventory display structures by customers and employees of the store. The details of a region proposal subsystem are presented in U.S. patent application Ser. No. 15/907,112, filed 27 Feb. 2018, titled, "Item Put and Take Detection Using Image Recognition" which is incorporated herein by reference as if fully set forth herein.

In another embodiment, the architecture includes a "semantic diffing" subsystem (also referred to as second image processors) that can be used in parallel to the third image processors to detect puts and takes of inventory items and to associate these puts and takes to subjects in the shopping store. This semantic diffing subsystem includes background image recognition engines, which receive corresponding sequences of images from the plurality of cameras and recognize semantically significant differences in the background (i.e. inventory display structures like shelves) as they relate to puts and takes of inventory items, for example, over time in the images from each camera. The second image processors receive output of the subject identification subsystem 904 and image frames from cameras 114 as input. Details of "semantic diffing" subsystem are presented in U.S. Pat. No. 10,127,438, filed 4 Apr. 2018, titled, "Predicting Inventory Events using Semantic Diffing," and U.S. patent application Ser. No. 15/945,473, filed 4 Apr. 2018, titled, "Predicting Inventory Events using Foreground/Background Processing," both of which are incorporated herein by reference as if fully set forth herein. The second image processors process identified background changes to make a second set of detections of takes of inventory items by identified subjects and of puts of inventory items on inventory display structures by identified subjects. The second set of detections are also referred to as background detections of puts and takes of inventory items. In the example of a shopping store, the second detections identify inventory items taken from the inventory locations or put on the inventory locations by customers or employees of the store. The semantic diffing subsystem includes the logic to associate identified background changes with identified subjects.

In such an embodiment, the system described in FIG. 9A includes a selection logic to process the first and second sets of detections to generate log data structures including lists of inventory items for identified subjects. For a take or put in the real space, the selection logic selects the output from either the semantic diffing subsystem or the region proposals subsystem 908. In one embodiment, the selection logic uses a confidence score generated by the semantic diffing subsystem for the first set of detections and a confidence score generated by the region proposals subsystem for a second set of detections to make the selection. The output of the subsystem with a higher confidence score for a particular detection is selected and used to generate a log data structure 700 (also referred to as a shopping cart data structure) including a list of inventory items (and their quantities) associated with identified subjects. The shelf and store inventory data structures are updated using the subjects' log data structures as described above.

A subject exit detection engine 910 determines if a customer is moving towards the exit door and sends a signal to the store inventory engine 190. The store inventory engine determines if one or more items in the log data structure 700 of the customer has a low identification confidence score as determined by the second or third image processors. If so, the inventory consolidation engine sends a notification to a store employee positioned close to the exit to confirm the item purchased by the customer. The inventory data structures of the subjects, inventory locations and the shopping stores are stored in the inventory database 160.

Figure 9B:
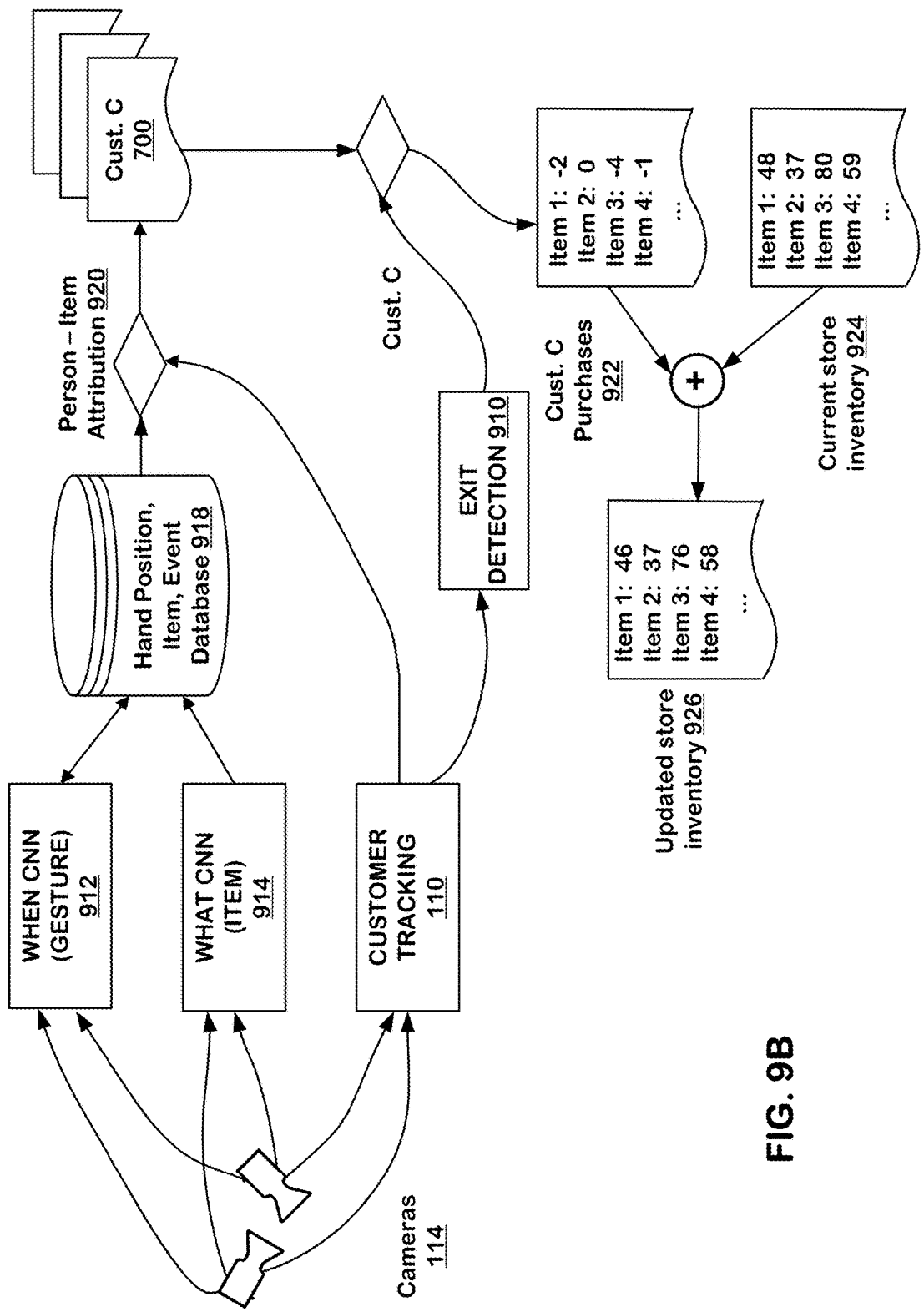
FIG. 9B is an example architecture in which the technique presented in the flowchart of FIG. 8 can be used to update the store inventory data structure.

FIG. 9B presents another architecture of a system in which customer inventory, inventory location (e.g. shelf) inventory and the store inventory (e.g. store wide) data structures are updated using the puts and takes of items by customers in the shopping store. Because FIG. 9A is an architectural diagram, certain details are omitted to improve the clarity of description. As described above, the system receives image frames from a plurality of synchronized cameras 114. The WhatCNN 914 uses image recognition engines to determine items in hands of customers in the area of real space (such as a shopping store). In one embodiment, there is one WhatCNN per camera 114 performing the image processing of the sequence of image frames produced by the respective camera. The WhenCNN 912, performs a time series analysis of the outputs of WhatCNNs to identify a put or a take event. The inventory event along with the item and hand information is stored in the database 918. This information is then combined with customer information generated by the customer tracking engine 110 (also referred above as subject tracking engine 110) by person-item attribution component 920. Log data structures 700 for customers in the shopping store are generated by linking the customer information stored in the database 918.

The technology disclosed uses the sequences of images produced by the plurality of cameras to detect departure of the customer from the area of real space. In response to the detection of the departure of the customer, the technology disclosed updates the store inventory in the memory for items associated with inventory events attributed to the customer. When the exit detection engine 910 detects departure of customer "C" from the shopping store, the items purchased by the customer "C" as shown in the log data structure 922 are consolidated with the inventory data structure of the store 924 to generate an updated store inventory data structure 926. For example, as shown in FIG. 9B, the customer has purchased two quantity of item 1, four quantity of item 3, and 1 quantity of item 4. The quantities of respective items purchased by the customer "C" as indicated in her log data structure 922 are subtracted from the store inventory 924 to generate updated store inventory data structure 926 which shows that the quantity of item 1 is now reduced from 48 to 46, similarly the quantities of items 3 and 4 are reduced by the number of respective quantity of item 3 and item 4 purchased by the customer "C". The quantity of item 2 remains the same in the updated store inventory data structure 926 as before in the current store inventory data structure 924 as the customer "C" did not purchase item 2.

In one embodiment, the departure detection of the customer, also triggers updating of the inventory data structures of the inventory locations (such as shelves in the shopping store) from where the customer has taken items. In such an embodiment, the inventory data structures of the inventory locations are not updated immediately after the take or a put inventory event as described above. In this embodiment, when the system detects the departure of customer, the inventory events associated with the customer are traversed linking the inventory events with respective inventory locations in the shopping store. The inventory data structures of the inventory locations determined by this process are updated. For example, if the customer has taken two quantities of item 1 from inventory location 27, then, the inventory data structure of inventory location 27 is updated by reducing the quantity of item 1 by two. Note that, an inventory item can be stocked on multiple inventory locations in the shopping store. The system identifies the inventory location corresponding to the inventory event and therefore, the inventory location from where the item is taken is updated.

Store Realograms

The locations of inventory items throughout the real space in a store, including at inventory locations in the shopping store, change over a period of time as customers take items from the inventory locations and put the items that they do not want to buy, back on the same location on the same shelf from which the item is taken, a different location on the same shelf from which the item is taken, or on a different shelf. The technology disclosed uses the sequences of images produced by at least two cameras in the plurality of cameras to identify inventory events, and in in response to the inventory events, tracks locations of inventory items in the area of real space. The items in a shopping store are arranged in some embodiments according to a planogram which identifies the inventory locations (such as shelves) on which a particular item is planned to be placed. For example, as shown in an illustration 910 in FIG. 10, a left half portion of shelf 3 and shelf 4 are designated for an item (which is stocked in the form of cans). Consider, the inventory locations are stocked according to the planogram at the beginning of the day or other inventory tracking interval (identified by a time t=0).

Figure 10:
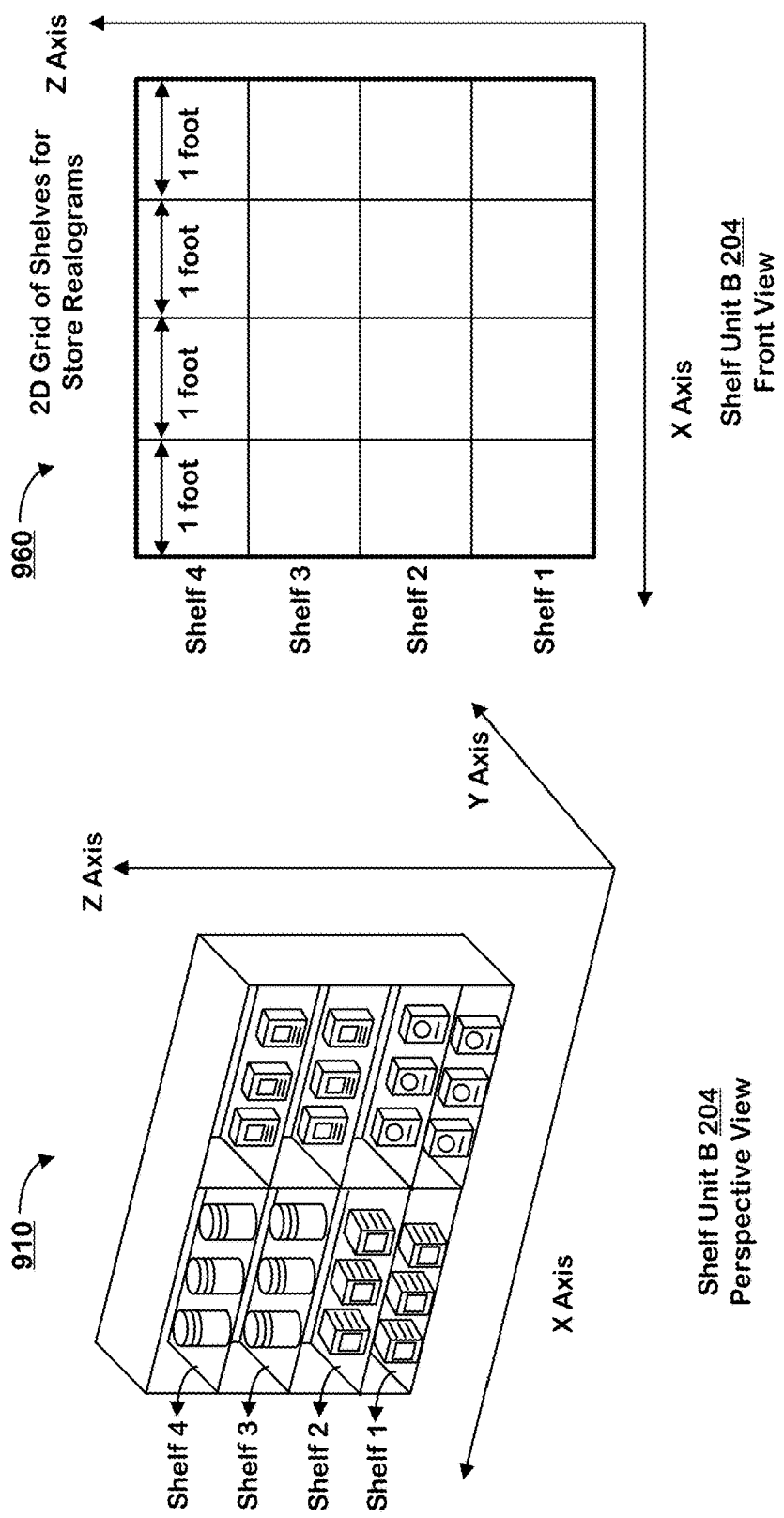
FIG. 10 illustrates discretization of shelves in portions in an inventory display structure using two dimensional (2D) grids.
Figure 11A:
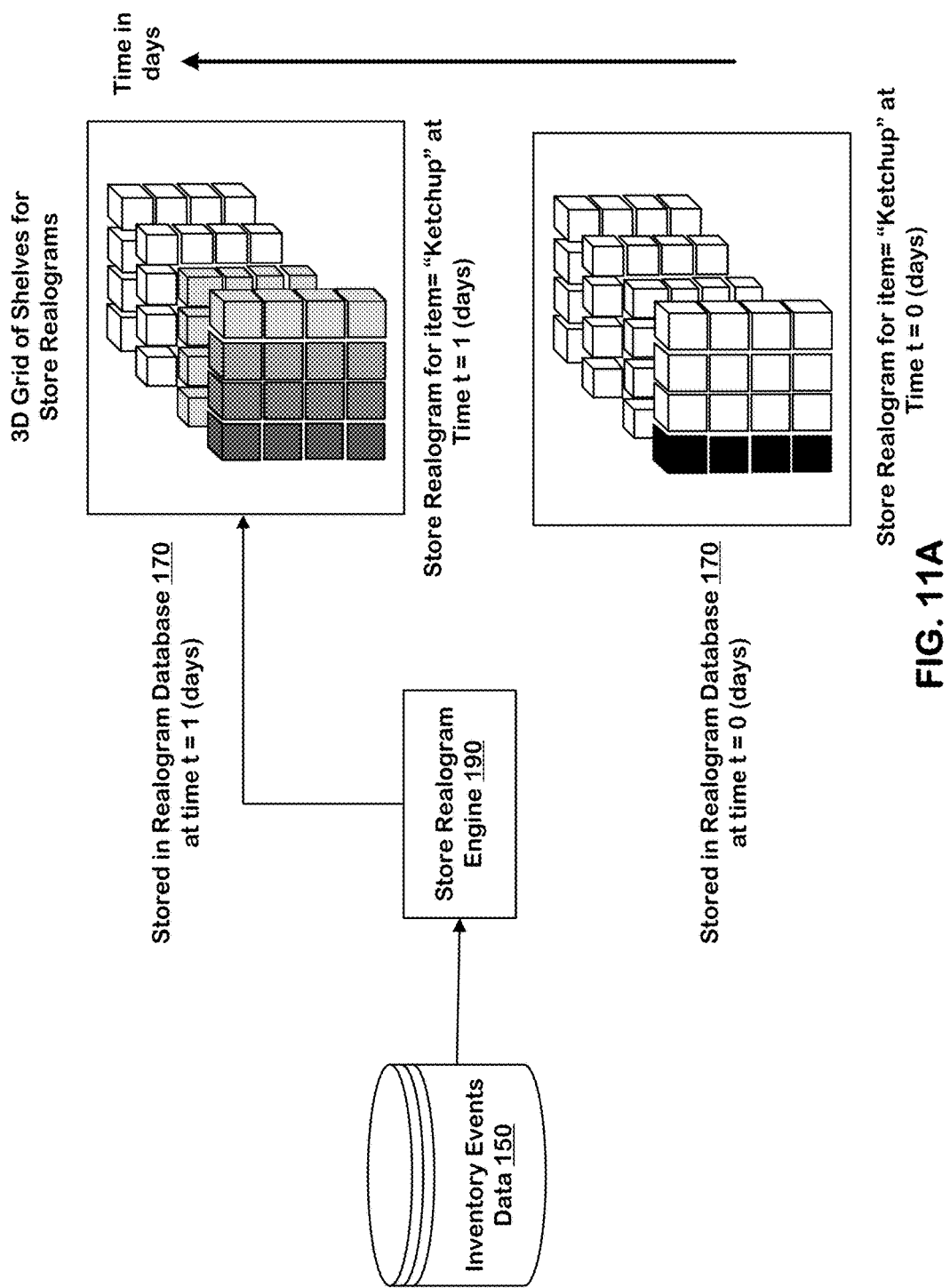
FIG. 11A is an example illustration of realograms using three dimensional (3D) grids of shelves showing locations of an inventory item dispersed from its designated locations on portions of shelves in an inventory display structure to other locations on the same shelves and to locations on different shelves in other inventory display structures in a shopping store after one day.

The technology disclosed can calculate a "realogram" of the shopping store at any time "t" which is the real time map of locations of inventory items in the area of real space, which can be correlated in addition in some embodiments with inventory locations in the store. A realogram can be used to create a planogram by identifying inventory items and a position in the store, and mapping them to inventory locations. In an embodiment, the system or method can create a data set defining a plurality of cells having coordinates in the area of real space. The system or method can divide the real space into a data set defining a plurality of cells using the length of the cells along the coordinates of the real space as an input parameter. In one embodiment, the cells are represented as two dimensional grids having coordinates in the area of real space. For example, the cells can correlate with 2D grids (e.g. at 1 foot spacing) of front plan of inventory locations in shelf units (also referred to as inventory display structures) as shown in the illustration 960 in FIG. 10. Each grid is defined by its starting and ending positions on the coordinates of the two dimensional plane such as x and z coordinates as shown in FIG. 10. This information is stored in maps database 140. In one embodiment, In another embodiment, the cells are represented as three dimensional (3D) grids having coordinates in the area of real space. In one example, the cells can correlate with volume on inventory locations (or portions of inventory locations) in shelf units in the shopping store as shown in FIG. 11A. In this embodiment, the map of the real space identifies a configuration of units of volume which can correlate with portions of inventory locations on inventory display structures in the area of real space. This information is stored in maps database 140. The store realogram engine 190 uses the inventory events database 150 to calculate a realogram of the shopping store at time "t" and stores it in the realogram database 170. The realogram of the shopping store indicates inventory items associated with inventory events matched by their locations to cells at any time t by using timestamps of the inventory events stored in the inventory events database 150. An inventory event includes an item identifier, a put or take indicator, location of the inventory event represented by positions along three axes of the area of real space, and a timestamp.

The illustration in FIG. 11A shows that at the beginning of the day 1 at t=0, left portions of inventory locations in the first shelf unit (forming a column-wise arrangement) contains "ketchup" bottles. The column of cells (or grids) is shown in black color in the graphic visualization, the cells can be rendered in other colors such as dark green color. All the other cells are left blank and not filled with any color indicating these do not contain any items. In one embodiment, the visualization of the items in the cell in a realogram is generated for one item at a time indicating its location in the store (within cells). In another embodiment, a realogram displays locations of sets of items on inventory locations using different colors to differentiate. In such an embodiment, a cell can have multiple colors corresponding to the items associated with inventory events matched to the cell. In another embodiment, other graphical or text-based visualizations are used to indicate inventory items in cells such as by listing their SKUs or names in the cells.

The system calculates SKU scores (also referred as scores) at a scoring time, for inventory items having locations matching particular cells using respective counts of inventory event. Calculation of scores for cells uses sums of puts and takes of inventory items weighted by a separation between timestamps of the puts and takes and the scoring time. In one embodiment, the scores are weighted averages of the inventory events per SKU. In other embodiments, different scoring calculations can be used such as a count of inventory events per SKU. In one embodiment, the system displays the realogram as an image representing cells in the plurality of cells and the scores for the cells. For example illustration in FIG. 11A, consider the scoring time t=1 (for example after one day). The realogram at time t=1 represents the scores for "Ketchup" item by different shades of black color. The store realogram at time t=1 shows all four columns of the first shelf unit and the second shelf unit (behind the first shelf unit) contain "ketchup" item. The cells with higher SKU scores for "ketchup" bottles are rendered using darker grey color as compared to cells with lower scores for "ketchup" bottles which are rendered in lighter shades of grey color. The cells with zero score values for ketchup are not left blank and not filled with any color. The realogram therefore, presents real time information about location of ketchup bottles on inventory locations in the shopping store after time t=1 (e.g. after 1 day). The frequency of generation of realogram can be set by the shopping store management according to their requirements. The realogram can also be generated on-demand by the store management. In one embodiment, the item location information generated by realogram is compared with store planogram to identify misplaced items. A notification can be sent to a store employee who can then put the misplaced inventory items back on their designated inventory locations as indicated in the store planogram.

Figure 11B:
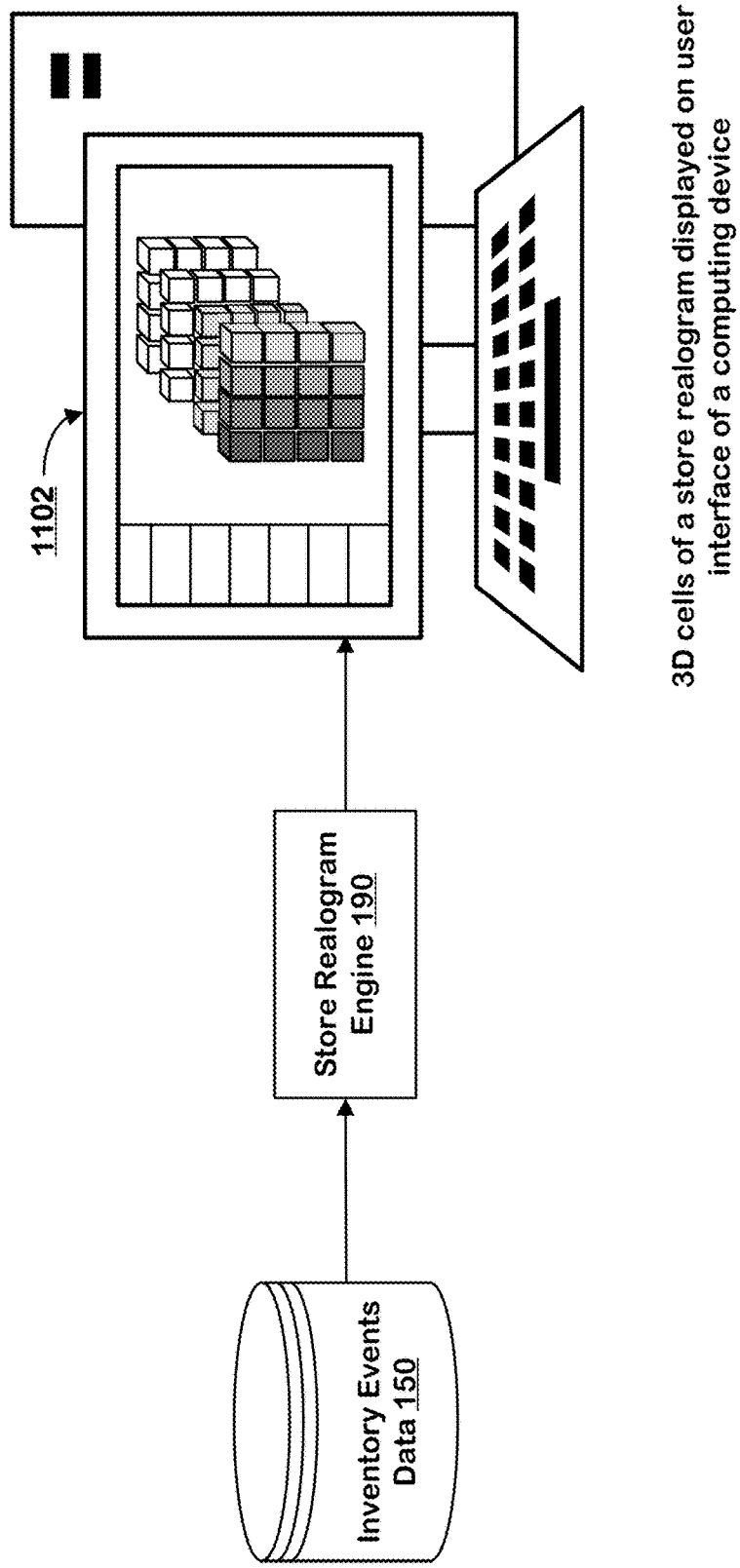
FIG. 11B is an example illustrating the realogram of FIG. 11A displayed on a user interface of a computing device.

In one embodiment, the system renders a display image representing cells in the plurality of cells and the scores for the cells. FIG. 11B shows a computing device with the realogram of FIG. 11A rendered on a user interface display 1102. The realogram can be displayed on other types of computing devices such as tablets, mobile computing devices, etc. The system can use variations in color in the display image representing cells to indicate scores for the cells. For example, in FIG. 11A, the column of cells containing "ketchup" at t=0 can be represented by dark green colored cells in that column. At t=1, as the "ketchup" bottles are dispersed in multiple cells beyond the first column of cells. The system can represent these cells by using different shades of green color to indicate the scores of cells. The darker shades of green indicating higher score and light green colored cells indicating lowers scores. The user interface displays other information produced, and provides tools to invoke the functions as well as display them.

Calculation of Store Realogram

Figure 12:
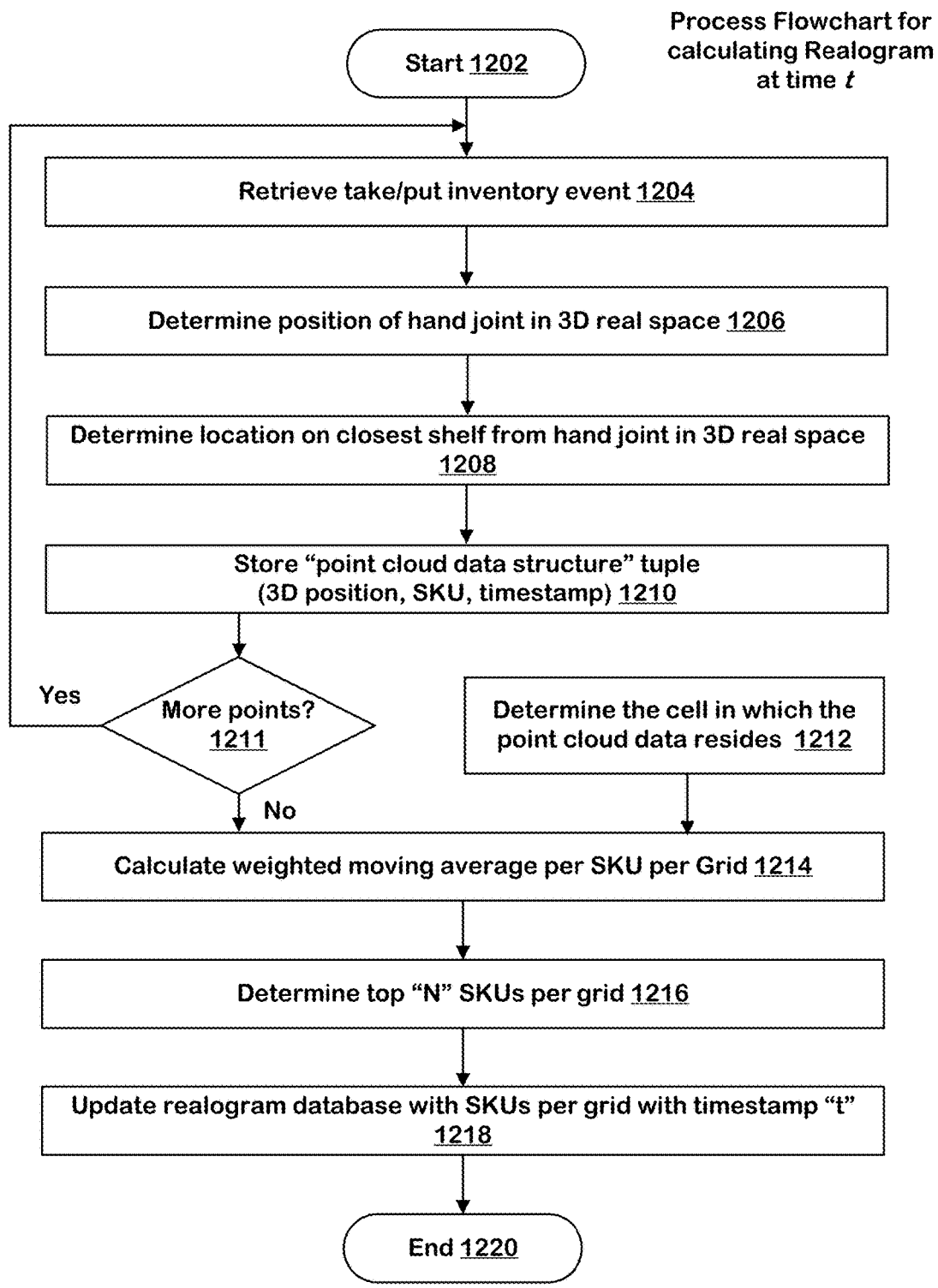
FIG. 12 is a flowchart showing process steps for calculating realogram of inventory items stocked on shelves in inventory display structures in a shopping store based on the locations of the puts and takes of inventory items.

FIG. 12 is a flowchart presenting process steps for calculating the realogram of shelves in an area of real space at a time t, which can be adapted for other types of inventory display structures. The process starts at step 1202. At step 1204, the system retrieves an inventory event in the area of real space from the inventory event database 150. The inventory event record includes an item identifier, a put or take indicator, location of the inventory event represented by positions in three dimensions (such as x, y, and z) of the area of real space, and a timestamp. The put or take indicator, identifies whether the customer (also referred to as a subject) has put the item on a shelf or taken the item from a shelf. The put event is also referred to as a plus inventory event and a take event is also referred to as a minus inventory event. The inventory event information is combined with output from the subject tracking engine 110 to identify the hand of the subject associated with this inventory event at step 1206.

The system uses the location of hand of the subject (step 1206) associated with the inventory event to determine a location. In some embodiments, the inventory event can be matched with a nearest shelf, or otherwise likely inventory location, in a shelf unit or an inventory display structure in step 1208. The process step 808 in the flowchart in FIG. 8 presents details of the technique that can be used to determine location on the nearest shelf to the hand position. As explained in the technique in step 808, the shortest distance D from a point E in the real space to any point P on the plane (representing the front plan region of shelf on the xz plane) can be determined by projecting the vector PE on a normal vector n to the plane. The intersection of the vector PE to the plane gives the nearest point on the shelf to the hand. The location of this point is stored in a "point cloud" data structure (step 1210) as a tuple containing the 3D position of the point in the area of real space, SKU of the item and the timestamp, the latter two are obtained from inventory event record. If there are more inventory event records (step 1211) in the inventory event database 150, the process steps 1204 to 1210 are repeated. Otherwise, the process continues at step 1214.

The technology disclosed includes a data set stored in memory defining a plurality of cells having coordinates in the area of real space. The cells define regions in the area of real space bounded by starting and ending positions along the coordinate axes. The area of real space includes a plurality of inventory locations, and the coordinates of cells in the plurality of cells can be correlated with inventory locations in the plurality of inventory locations. The technology disclosed matches locations of inventory items, associated with inventory events, with coordinates of cells and maintains a data representing inventory items matched with cells in the plurality of cells. In one embodiment, the system determines the nearest cell in the data set based on the location the inventory events by executing a procedure (such as described in step 808 in the flowchart of FIG. 8) to calculate a distance from the location of the inventory event to cells in the data set and match the inventory event with a cell based on the calculated distance. This matching of the event location to the nearest cell gives position of the point cloud data identifying the cell in which the point cloud data resides (step 1212). In one embodiment, the cells can map to portions of inventory locations (such as shelves) in inventory display structures. Therefore, the portion of the shelf is also identified by using this mapping. As described above, the cells can be represented as 2D grids or 3D grids of the area of real space. The system includes logic that calculates scores at a scoring time for inventory items having locations matching particular cells. In one embodiment, the scores are based on counts of inventory events. In this embodiment, the scores for cells use sums of puts and takes of inventory items weighted by a separation between timestamps of the puts and takes and the scoring time. For example, the score can be a weighted moving average per SKU (also referred to as SKU score) and is calculated per cell using the "point cloud" data points mapped to the cell:

$$SKU\ Score = \sum \left( \frac{1}{2^{point\_t}} \right) \quad (1)$$

The SKU score calculated by equation (1) is the sum of scores for all point cloud data points of the SKU in the cell such that each data point is weighted down by the time point_t in days since the timestamp of the put and take event. Consider there are two point cloud data points for "ketchup" item in a grid. The first data point has a timestamp which indicates that this inventory event occurred two days before the time "t" at which the realogram is calculated, therefore the value of point_t is "2". The second data point corresponds to an inventory event that occurred one day before the time "t", therefore, point_t is "1". The score of ketchup for the cell (identified by a cell_id which maps to a shelf identified by a shelf_id) is calculated as:

$$SKU\ Score_{(Ketchup, Shelf\_Id, Cell\_Id)} = \sum \left( \frac{1}{2^2}, \frac{1}{2^1} \right)$$

As the point cloud data points corresponding to inventory events become older (i.e. more days have passed since the event) their contribution to the SKU score decreases. At step 1216, a top "N" SKUs are selected for a cell with the highest SKU scores. In one embodiment, the system includes logic to select a set of inventory items for each cell based on the scores. For example, the value of "N" can be selected as 10 (ten) to select top ten inventory items per call based on their SKU scores. In this embodiment, the realogram stores top ten items per cell. The updated realogram at time t is then stored in step 1218 in the realogram database 170 which indicates top "N" SKUs per cell in a shelf at time t. The process ends at step 1220.

In another embodiment, the technology disclosed does not use 2D or 3D maps of portions of shelves stored in the maps database 140 to calculate point cloud data in portions of shelves corresponding to inventory events. In this embodiment, the 3D real space representing a shopping store is partitioned in cells represented as 3D cubes (e.g., 1 foot cubes). The 3D hand positions are mapped to the cells (using their respective positions along the three axes). The SKU scores for all items are calculated per cell using equation 1 as explained above. The resulting realogram shows items in cells in the real space representing the store without requiring the positions of shelves in the store. In this embodiment, a point cloud data point may be at the same position on the coordinates in the real space as the hand position corresponding to the inventory event, or at the location of a cell in the area close to or encompassing the hand position. This is because there may be no map of shelves therefore; the hand positions are not mapped to the nearest shelf. Because of this, the point cloud data points in this embodiment are not necessarily co-planar. All point cloud data points within the unit of volume (e.g., 1 foot cube) in the real space are included in calculation of SKU scores.

In some embodiments, the realogram can be computed iteratively, and used for time of day analysis of activity in the store, or used to produce animation (like stop motion animation) for display of the movement of inventory items in the store over time.

Applications of Store Realogram

A store realogram can be used in many operations of the shopping store. A few applications of the realogram are presented in the following paragraphs.

Re-Stocking of Inventory Items

Figure 13A:
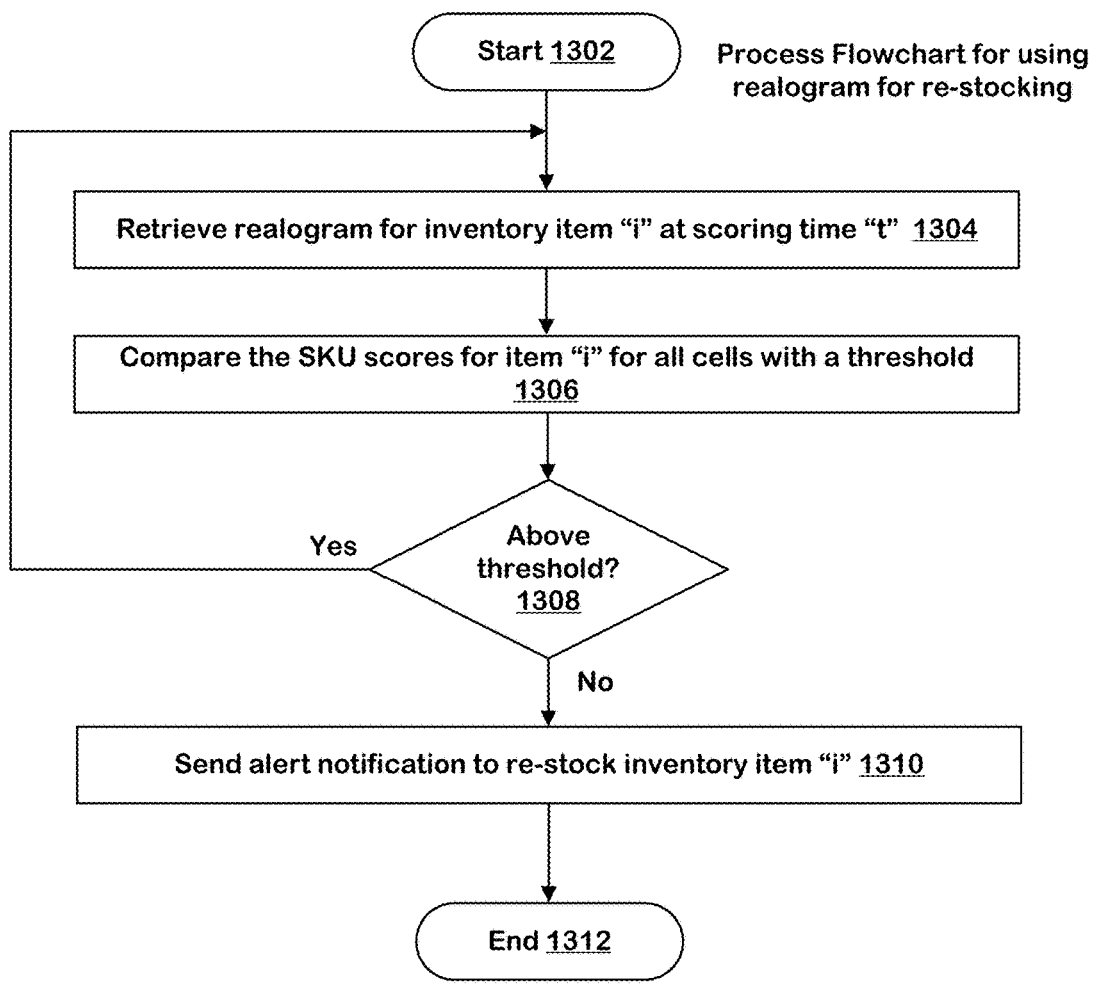
FIG. 13A is a flowchart illustrating process steps for use of realogram to determine re-stocking of inventory items.

FIG. 13A presents one such application of the store realogram to determine if an inventory item needs to be re-stocked on inventory locations (such as shelves). The process starts at step 1302. At step 1304, the system retrieves the realogram at scoring time "t" from the realogram database 170. In one example, this is the most recently generated realogram. The SKU scores for the item "i" for all cells in the realogram are compared with a threshold score at step 1306. If the SKU scores are above the threshold (step 1308), the process repeats steps 1304 and 1306 for a next inventory item "i". In embodiments including planograms, or if a planogram is available, the SKU scores for the item "i" are compared with threshold for cells which match the distribution of the inventory item 'i' in the planogram. In another embodiment, the SKU scores for inventory items are calculated by filtering out "put" inventory events. In this embodiment, the SKU scores reflects "take" events of inventory item "i" per cells in the realogram which can then be compared with the threshold. In another embodiment, a count of "take" inventory events per cell can be used as a score for comparing with a threshold for determining re-stocking of the inventory item "i". In this embodiment, the threshold is a minimum count of inventory item which needs to be stocked at an inventory location.

Figure 13B:
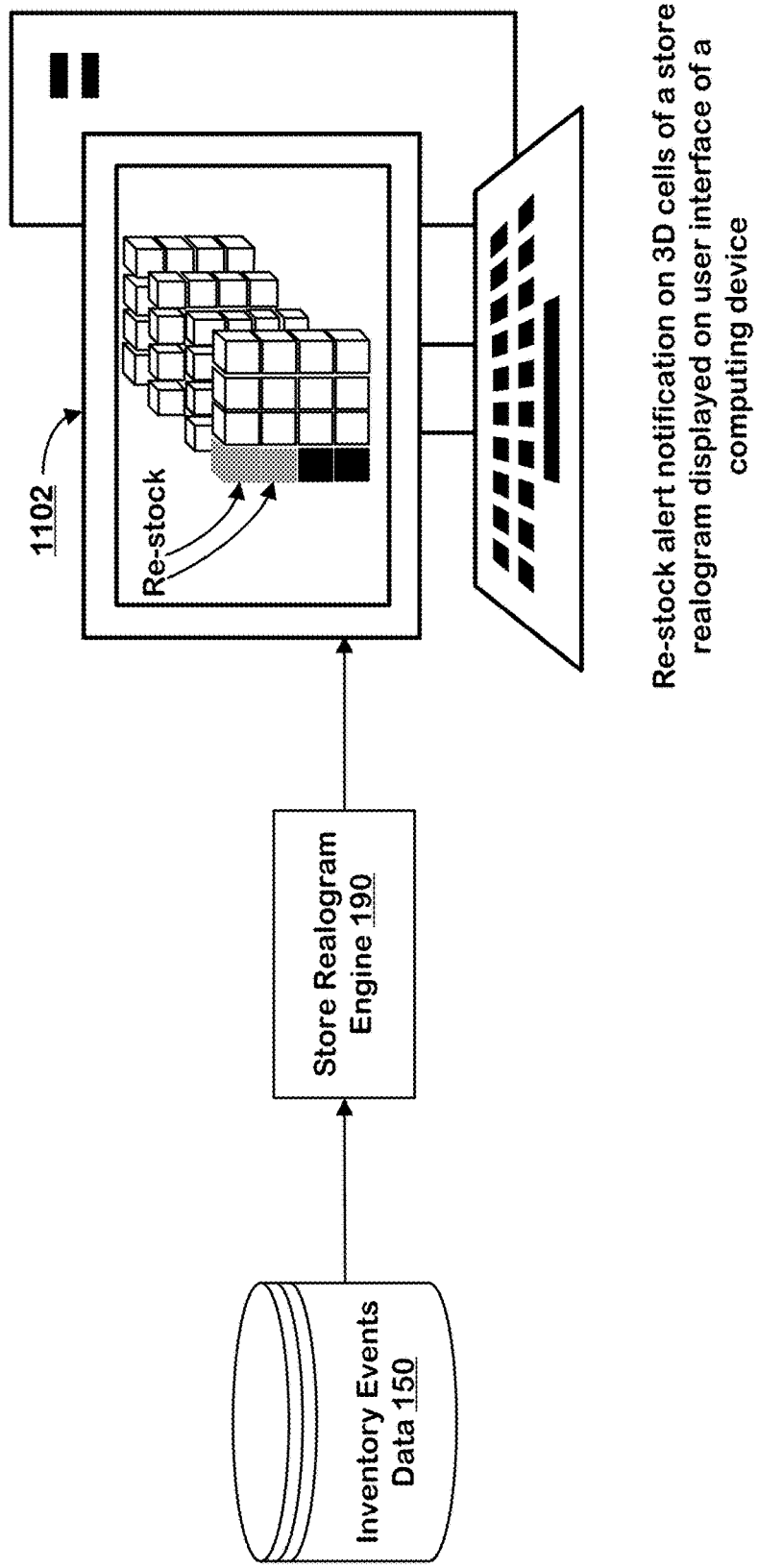
FIG. 13B is an example user interface displaying the re-stocking notification for an inventory item.

If the SKU score of inventory item 'i' is less than the threshold, an alert notification is sent to store manager or other designated employees indicating inventory item 'i' needs to be re-stocked (step 1310). The system can also identify the inventory locations at which the inventory item needs to be re-stocked by matching the cells with SKU score below threshold to inventory locations. In other embodiments, the system can check the stock level of inventory item 'i' in stock room of the shopping store to determine if inventory item 'i' needs to be ordered from a distributor. The process ends at step 1312. FIG. 13B presents an example user interface, displaying the re-stock alert notification for an inventory item. The alert notifications can be displayed on user interface of other types of devices such as tablets, and mobile computing devices. The alerts can also be sent to designated recipients via an email, an SMS (short message service) on a mobile phone, or a notification to store application installed on a mobile computing device.

Misplaced Inventory Items

Figure 14A:
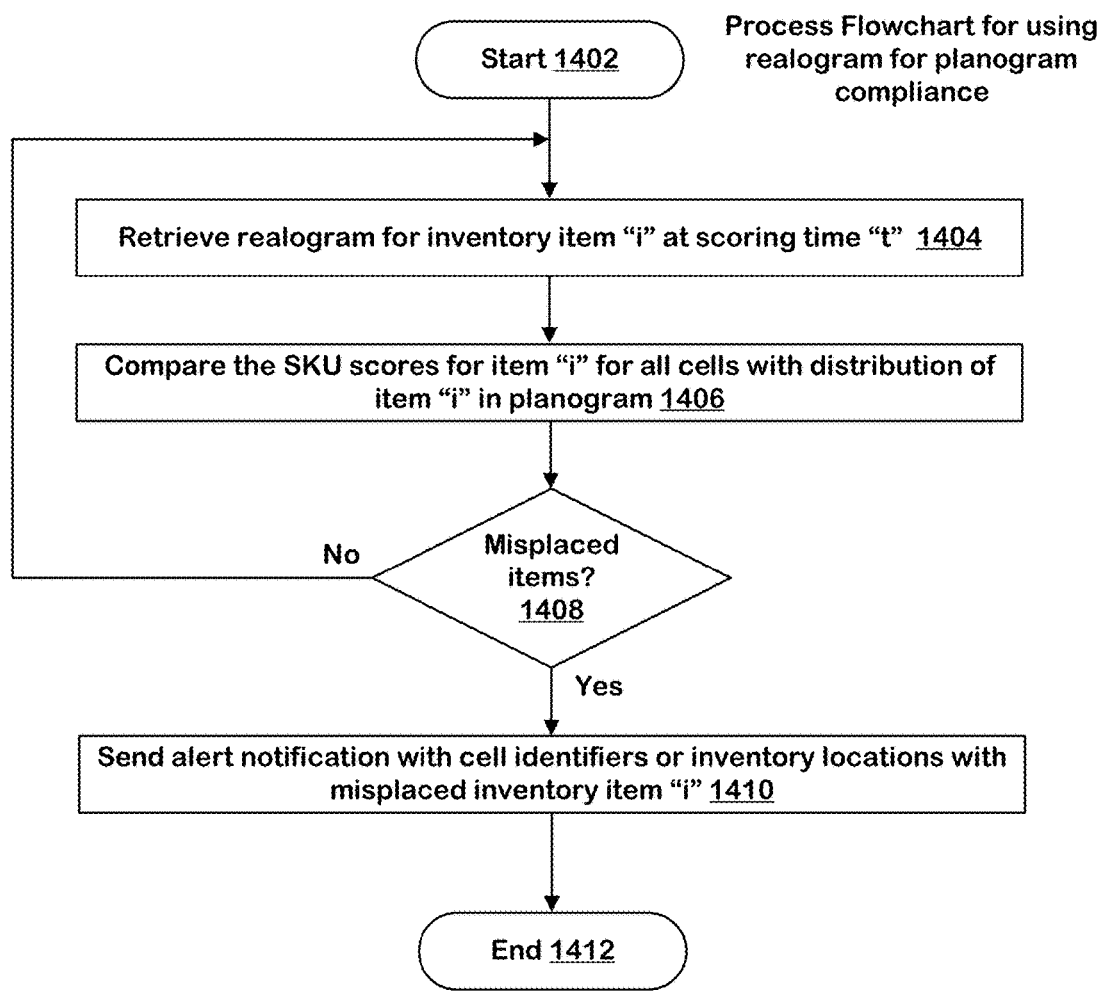
FIG. 14A is a flowchart showing process steps for use of realogram to determine planogram compliance.

In embodiments including planograms, or if a planogram of the store is otherwise available, then the realogram is compared with the planogram for planogram compliance by identifying misplaced items. In such an embodiment, the system includes a planogram specifying a distribution of inventory items in inventory locations in the area of real space. The system includes logic to maintain data representing inventory items matched with cells in the plurality of cells. The system determines misplaced items by comparing the data representing inventory matched with cells to the distribution of inventory items in the inventory locations specified in the planogram. FIG. 14 presents a flowchart for using realogram to determine planogram compliance. The process starts at step 1402. At step 1404, the system retrieves realogram for inventory item "i" at scoring time "t". The scores of the inventory item "i" in all cells in the realogram are compared with distribution of inventory item 'i' in planogram (step 1406). If the realogram indicates SKU scores for inventory item "i" above a threshold at cells which do not match with the distribution of inventory item "i" in the planogram (step 1408), the system identifies these items as misplaced. Alerts or notification for items which are not matched to distribution of inventory items in the planogram, are sent to a store employee, who can then take the misplaced items from their current location and put back on their designated inventory location (step 1410). If no misplaced items are identified at step 1408, process steps 1404 and 1406 are repeated for a next inventory item "i".

Figure 14B:
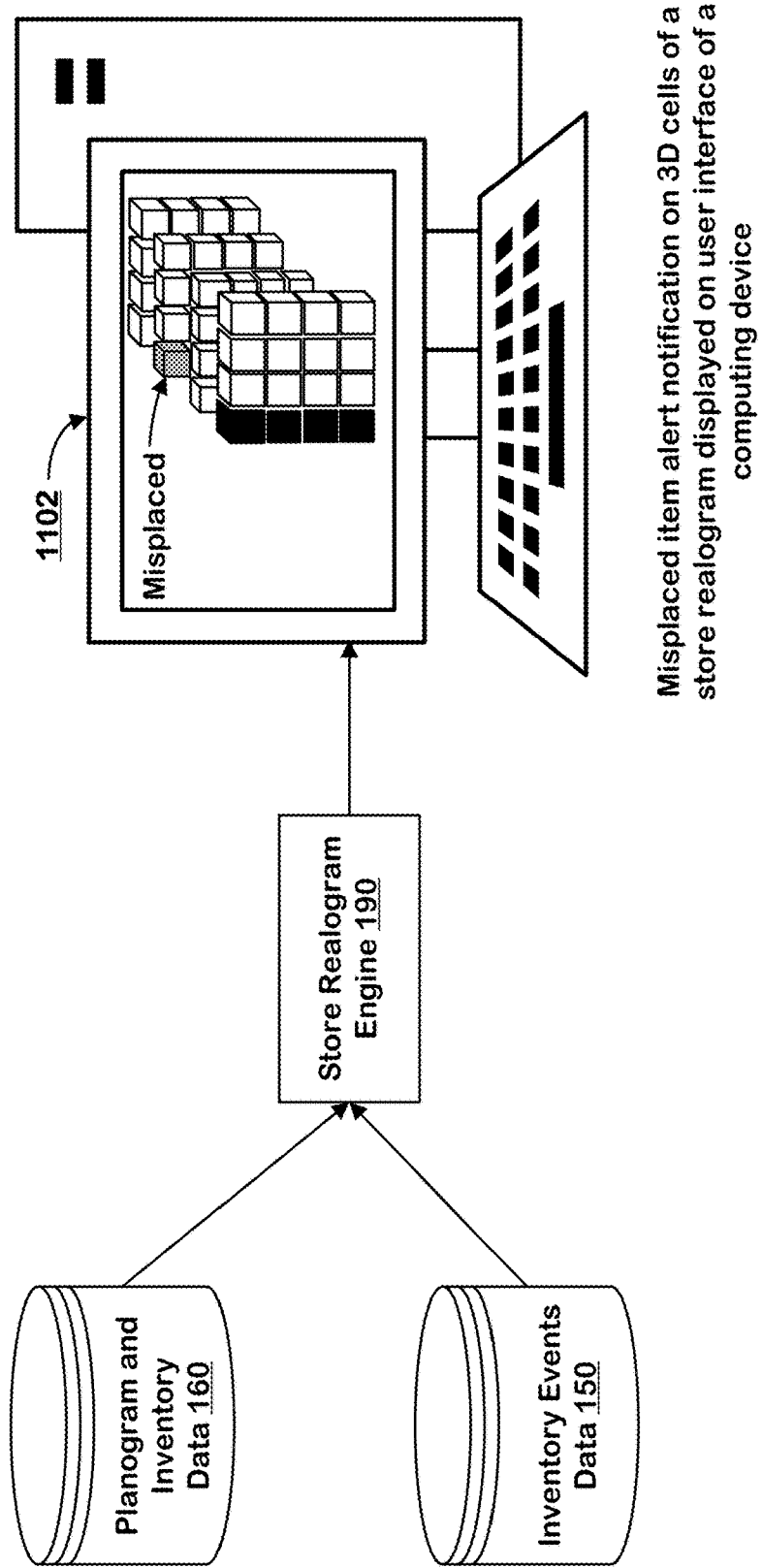
FIG. 14B is an example user interface displaying misplaced item notification for an inventory item.

In one embodiment, the store app displays location of items on a store map and guides the store employee to the misplaced item. Following this, the store app displays the correct location of the item on the store map and can guide the employee to the correct shelf portion to put the item in its designated location. In another embodiment, the store app can also guide a customer to an inventory item based on a shopping list entered in the store app. The store app can use real time locations of the inventory items using the realogram and guide the customer to a nearest inventory location with the inventory item on a map. In this example, the nearest location of an inventory item can be of a misplaced item which is not positioned on the inventory location according to the store planogram. FIG. 14B presents an example user interface displaying an alert notification of a misplaced inventory item "i" on the user interface display 1102. As described above in FIG. 13B, different types of computing devices and alert notification mechanisms can be used for sending this information to store employees.

Improving Inventory Item Prediction Accuracy

Figure 15:
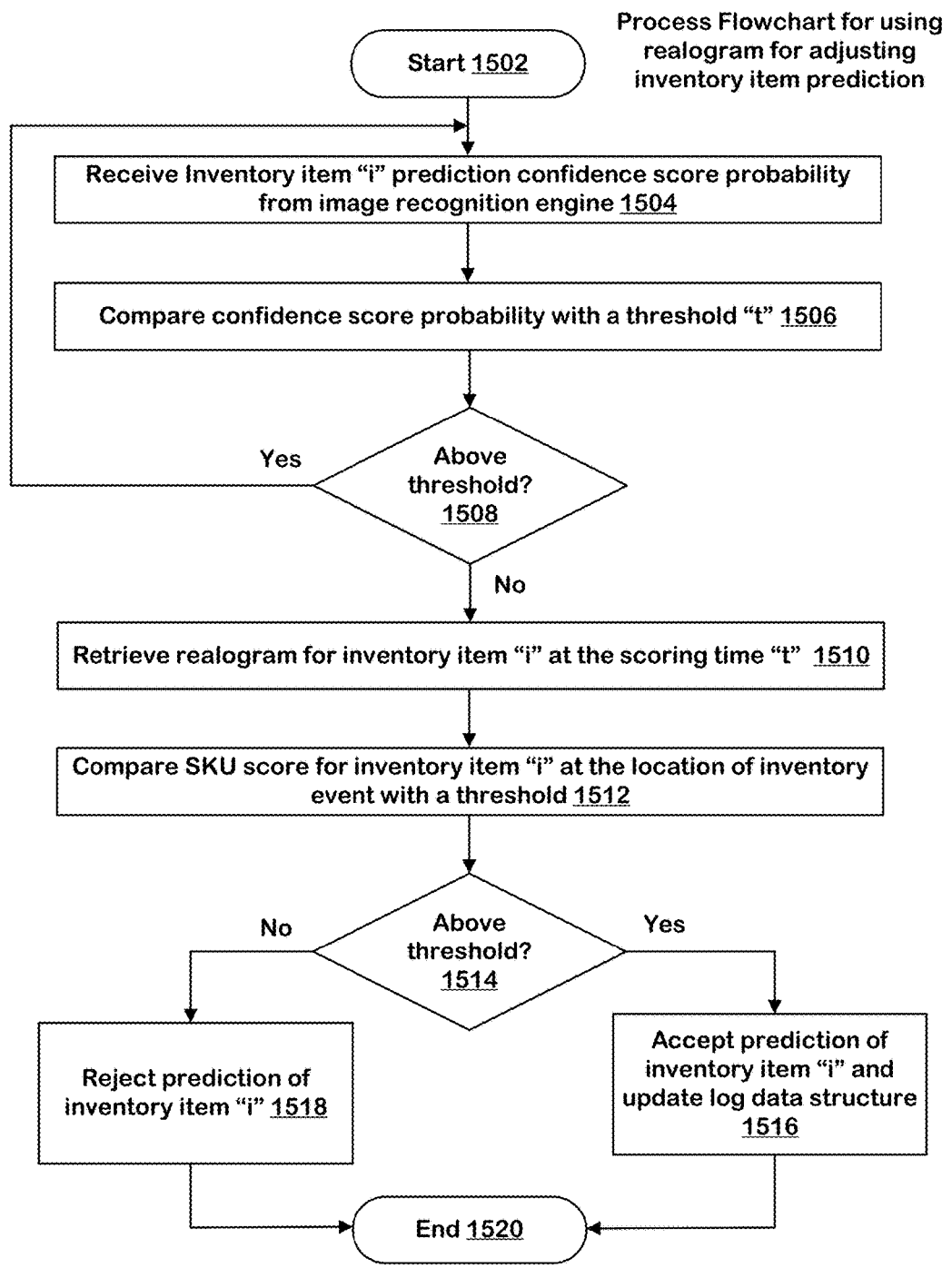
FIG. 15 is a flowchart showing process steps for use of realogram to adjust confidence score probability of inventory item prediction.

Another application of realogram is in improving prediction of inventory items by the image recognition engine. The flowchart in FIG. 15 presents example process steps to adjust inventory item prediction using a realogram. The process starts at step 1502. At step 1504, the system receives a prediction confidence score probability for item "i" from image recognition engine. A WhatCNN, as described above, is an example image recognition engine which identifies inventory items in hands of subjects (or customers). The WhatCNN outputs a confidence score (or confidence value) probability for the predicted inventory item. At step 1506, the confidence score probability is compared with a threshold. If the probability value is above the threshold, indicating a higher confidence of prediction (step 1508), the process is repeated for a next inventory item 'i'. Otherwise, if the confidence score probability is less than the threshold, the process continues at step 1510.

The realogram for inventory item "i" at scoring time "t" is retrieved at step 1510. In one example, this can be a most recent realogram while in another example, a realogram at a scoring time 't' matching or closer in time to the time of the inventory event can be retrieved from the realogram database 170. The SKU score of the inventory item "i" at the location of the inventory event is compared with a threshold at a step 1512. If the SKU score is above the threshold (step 1514), the prediction of inventory item "i" by the image recognition is accepted (step 1516). The log data structure of the customer associated with the inventory event is updated accordingly. If the inventory event is a "take" event, the inventory item "i" is added to the log data structure of the customer. If the inventory event is a "put" event, the inventory item "i" is removed from the log data structure of the customer. If the SKU score below the threshold (step 1514), the prediction of the image recognition engine is rejected (step 1518). If the inventory event is a "take" event, this will result in the inventory item "i" not added to the log data structure of the customer. Similarly, if the inventory event is a "put" event, the inventory item "i" is not removed from the log data structure of the customer. The process ends at step 1520. In another embodiment, the SKU score of the inventory item "i" can be used to adjust an input parameter to the image recognition engine for determining item prediction confidence score. A WhatCNN, which is a convolutional neural network (CNN), is an example of an image recognition engine to predict inventory items.

Network Configuration

Figure 16:
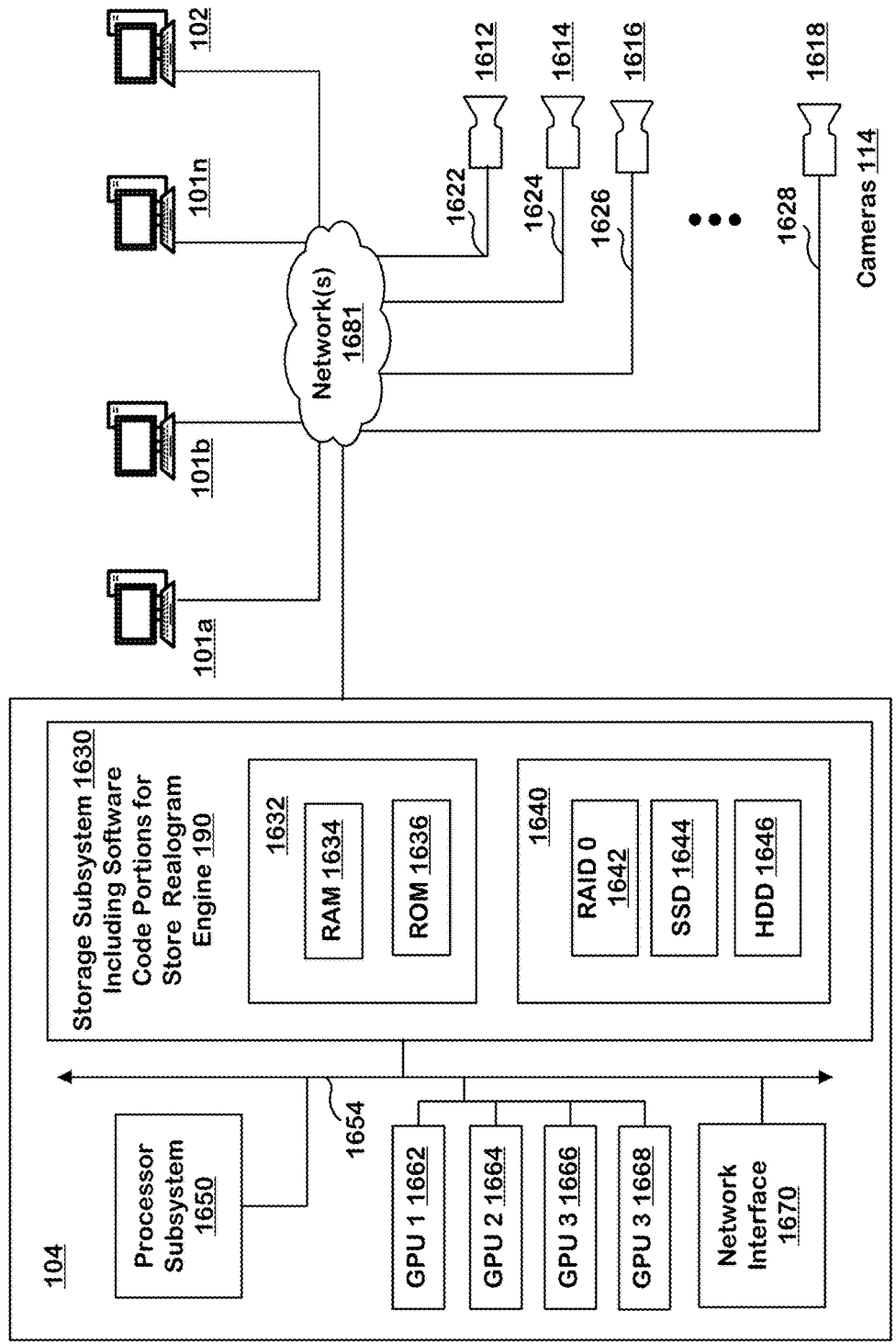
FIG. 16 is a camera and computer hardware arrangement configured for hosting the inventory consolidation engine and store realogram engine of FIG. 1.

FIG. 16 presents an architecture of a network hosting the store realogram engine 190 which is hosted on the network node 106. The system includes a plurality of network nodes 101*a*, 101*b*, 101*n*, and 102 in the illustrated embodiment. In such an embodiment, the network nodes are also referred to as processing platforms. Processing platforms (network nodes) 103, 101*a*-101*n*, and 102 and cameras 1612, 1614, 1616, . . . 1618 are connected to network(s) 1681. A similar network hosts the store inventory engine 180 which is hosted on the network node 104.

FIG. 13 shows a plurality of cameras 1612, 1614, 1616, . . . 1618 connected to the network(s). A large number of cameras can be deployed in particular systems. In one embodiment, the cameras 1612 to 1618 are connected to the network(s) 1681 using Ethernet-based connectors 1622, 1624, 1626, and 1628, respectively. In such an embodiment, the Ethernet-based connectors have a data transfer speed of 1 gigabit per second, also referred to as Gigabit Ethernet. It is understood that in other embodiments, cameras 114 are connected to the network using other types of network connections which can have a faster or slower data transfer rate than Gigabit Ethernet. Also, in alternative embodiments, a set of cameras can be connected directly to each processing platform, and the processing platforms can be coupled to a network.

Storage subsystem 1630 stores the basic programming and data constructs that provide the functionality of certain embodiments of the present invention. For example, the various modules implementing the functionality of the store realogram engine 190 may be stored in storage subsystem 1630. The storage subsystem 1630 is an example of a computer readable memory comprising a non-transitory data storage medium, having computer instructions stored in the memory executable by a computer to perform all or any combination of the data processing and image processing functions described herein, including logic to logic to calculate realograms for the area of real space by processes as described herein. In other examples, the computer instructions can be stored in other types of memory, including portable memory, that comprise a non-transitory data storage medium or media, readable by a computer.

These software modules are generally executed by a processor subsystem 1650. A host memory subsystem 1632 typically includes a number of memories including a main random access memory (RAM) 1634 for storage of instructions and data during program execution and a read-only memory (ROM) 1636 in which fixed instructions are stored. In one embodiment, the RAM 1634 is used as a buffer for storing point cloud data structure tuples generated by the store realogram engine 190.

A file storage subsystem 1640 provides persistent storage for program and data files. In an example embodiment, the storage subsystem 1640 includes four 120 Gigabyte (GB) solid state disks (SSD) in a RAID 0 (redundant array of independent disks) arrangement identified by a numeral 1642. In the example embodiment, maps data in the maps database 140, inventory events data in the inventory events database 150, inventory data in the inventory database 160, and realogram data in the realogram database 170 which is not in RAM is stored in RAID 0. In the example embodiment, the hard disk drive (HDD) 1646 is slower in access speed than the RAID 0 1642 storage. The solid state disk (SSD) 1644 contains the operating system and related files for the store realogram engine 190.

In an example configuration, four cameras 1612, 1614, 1616, 1618, are connected to the processing platform (network node) 103. Each camera has a dedicated graphics processing unit GPU 1 1662, GPU 2 1664, GPU 3 1666, and GPU 4 1668, to process images sent by the camera. It is understood that fewer than or more than three cameras can be connected per processing platform. Accordingly, fewer or more GPUs are configured in the network node so that each camera has a dedicated GPU for processing the image frames received from the camera. The processor subsystem 1650, the storage subsystem 1630 and the GPUs 1662, 1664, and 1666 communicate using the bus subsystem 1654.

A network interface subsystem 1670 is connected to the bus subsystem 1654 forming part of the processing platform (network node) 104. Network interface subsystem 1670 provides an interface to outside networks, including an interface to corresponding interface devices in other computer systems. The network interface subsystem 1670 allows the processing platform to communicate over the network either by using cables (or wires) or wirelessly. A number of peripheral devices such as user interface output devices and user interface input devices are also connected to the bus subsystem 1654 forming part of the processing platform (network node) 104. These subsystems and devices are intentionally not shown in FIG. 13 to improve the clarity of the description. Although bus subsystem 1654 is shown schematically as a single bus, alternative embodiments of the bus subsystem may use multiple busses.

In one embodiment, the cameras 114 can be implemented using Chameleon3 1.3 MP Color USB3 Vision (Sony ICX445), having a resolution of 1288×964, a frame rate of 30 FPS, and at 1.3 MegaPixels per image, with Varifocal Lens having a working distance (mm) of 300–∞, a field of view field of view with a ⅓" sensor of 98.2°-23.8.

The technology described herein also includes a system for tracking inventory items in an area of real space including inventory display structures, along with a corresponding method and computer program product, comprises a plurality of cameras or other sensors disposed above the inventory display structures, sensors in the plurality of sensors producing respective sequences of images of inventory display structures in corresponding fields of view in the real space, the field of view of each sensor overlapping with the field of view of at least one other sensor in the plurality of sensors; memory storing a data set, the data set defining a plurality of cells having coordinates in the area of real space; and a processing system coupled to the plurality of sensors, the processing system including logic that processes the sequences of images produced by the plurality of sensors to find locations of inventory events in three dimensions in the area of real space and in response to the inventory events determines a nearest cell in the data set based on the locations the inventory events, the processing system including logic that calculates scores at a scoring time for inventory items associated with the inventory events having locations matching particular cells using respective counts of inventory events. The system can include logic to select a set of inventory items for each cell based on the scores. The inventory events can include an item identifier, a put or a take indicator, locations represented by positions along three axes of the area of real space, and a timestamp. The system can include the data set defining a plurality of cells represented as two dimensional grids having coordinates in the area of real space, the cells correlate with portions of front plan of inventory locations, the processing system including logic that determines the nearest cell based on the location of inventory event. The system can include the data set defining a plurality of cells represented as three dimensional grids having coordinates in the area of real space, the cells correlate with portions of volume on inventory locations, the processing system including logic that determines the nearest cell based on the location of inventory event. The put indicator can identifies that the item is placed on an inventory location and the take indicator identifies that the item is taken off from the inventory location. The logic that processes the sequences of images produced by the plurality of sensors can comprise image recognition engines which generate data sets representing elements in the images corresponding to hands, and executes analysis of the data sets from sequences of images from at least two sensors to determine locations of inventory events in three dimensions. The image recognition engines can comprise convolutional neural networks. The logic that calculates scores for cells can use sums of puts and takes of inventory items weighted by a separation between timestamps of the puts and takes and the scoring time, and to store the scores in the memory. The logic to determine the nearest cell in the data set based on the location the inventory events can execute a procedure including calculating a distance from the location of the inventory event to cells in the data set and matching the inventory event with a cell based on the calculated distance.

Any data structures and code described or referenced above are stored according to many implementations in computer readable memory, which comprises a non-transitory computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A system for tracking inventory items in an area of real space, comprising:
   a plurality of sensors, sensors in the plurality of sensors producing respective sequences of images of corresponding fields of view in the real space, the field of view of each sensor overlapping with the field of view of at least one other sensor in the plurality of sensors; and
   a processing system coupled to the plurality of sensors, the processing system including logic that uses the sequences of images produced by at least two sensors in the plurality of sensors to identify inventory events, and in response to the inventory events, to track locations of inventory items in the area of real space, logic to match locations of inventory items with coordinates of cells in a plurality of cells having coordinates in the area of real space, and to maintain a data representing inventory items matched with cells in the plurality of cells, and logic that calculates scores at a scoring time for inventory items having locations matching particular cells, the scores based on counts of inventory events.

2. The system of claim 1, wherein the inventory events include an item identifier, a put or take indicator, locations represented by positions in three dimensions of the area of real space, and a timestamp.

3. The system of claim 1, wherein the area of real space includes a plurality of inventory locations, and including logic to match inventory locations with the coordinates of cells in the plurality of cells.

4. The system of claim 1, the logic that calculates scores for cells uses sums of puts and takes of inventory items weighted by a separation between timestamps of the puts and takes and the scoring time.

5. The system of claim 1, the processing system including logic to render a display image representing cells in the plurality of cells and the scores for the cells.

6. The system of claim 1, the processing system including logic to select a set of inventory items for each cell based on the scores.

7. The system of claim 1, wherein the area of real space includes a plurality of inventory locations, and the coordinates of cells in the plurality of cells correlate with inventory locations in the plurality of inventory locations, and including
   a planogram in memory specifying a distribution of inventory items in inventory locations in the area of real space, and
   the logic to maintain the data representing inventory items matched with cells in the plurality of cells includes, logic to determine misplaced items by comparing the data representing inventory matched with cells to the distribution of inventory items in the inventory locations specified in the planogram.

8. The system of claim 1, wherein the area of real space includes a plurality of inventory locations, and the coordinates of cells in the plurality of cells correlate with inventory locations in the plurality of inventory locations, and including the logic to maintain the data representing inventory items matched with cells in the plurality of cells includes, logic that determines, for a particular inventory item matched with particular cell, whether a count of the particular inventory item in that cell is below a threshold for re-stocking the inventory item on an inventory location correlating with the particular cell.

9. A method for tracking inventory items in an area of real space, the method including:
   using a plurality of sensors to produce respective sequences of images of corresponding fields of view in the real space, the field of view of each sensor overlapping with the field of view of at least one other sensor in the plurality of sensors;
   identifying inventory events using the sequences of images produced by at least two sensors in the plurality of sensors;
   tracking locations of inventory items in the area of real space in response to the identification of inventory events,
   matching locations of inventory items with coordinates of cells in a plurality of cells having coordinates in the area of real space, and maintaining a data representing inventory items matched with cells in the plurality of cells; and
   calculating scores at a scoring time, for inventory items having locations matching particular cells using respective counts of inventory events.

10. The method of claim 9, wherein the inventory events include an item identifier, a put or take indicator, locations represented by positions along three axes of the area of real space, and a timestamp.

11. The method of claim 9, wherein the area of real space includes a plurality of inventory locations, and the coordinates of cells in the plurality of cells correlate with inventory locations in the plurality of inventory locations.

12. The method of claim 9, further including calculating scores for cells using sums of puts and takes of inventory items weighted by a separation between timestamps of the puts and takes and the scoring time, and storing the scores in a memory.

13. The method of claim 9, further including rendering a display image representing cells in the plurality of cells and the scores for the cells.

14. The method of claim 9, further including selecting a set of inventory items for each cell based on the scores.

15. The method of claim 9, wherein the area of real space includes a plurality of inventory locations, and the coordinates of cells in the plurality of cells correlate with inventory locations in the plurality of inventory locations, the method further including
   specifying a distribution of inventory items in inventory locations in the area of real space as a planogram and storing the planogram in memory,
   and
   determining misplaced items by comparing the data representing inventory matched with cells to the distribution of inventory items in the inventory locations.

16. The method of claim 9, wherein the area of real space includes a plurality of inventory locations, and the coordinates of cells in the plurality of cells correlate with inventory locations in the plurality of inventory locations, the method further including
   determining for an inventory item matched with particular cell whether a count of the particular inventory item in that cell is below a threshold for re-stocking the inventory item on an inventory location correlating with the particular cell.

17. A non-transitory computer readable storage medium impressed with computer program instructions to track inventory items in an area of real space, the instructions, when executed on a processor, implement a method comprising:
   using a plurality of sensors to produce respective sequences of images of corresponding fields of view in the real space, the field of view of each sensor overlapping with the field of view of at least one other sensor in the plurality of sensors;
   identifying inventory events using the sequences of images produced by at least two sensors in the plurality of sensors;
   tracking locations of inventory items in the area of real space in response to the identification of inventory events;
   matching locations of inventory items with coordinates of cells in a plurality of cells having coordinates in the area of real space, and maintaining a data representing inventory items matched with cells in the plurality of cells; and
   calculating scores at a scoring time, for inventory items having locations matching particular cells using respective counts of inventory events.

18. The non-transitory computer readable storage medium of claim 17, wherein the inventory events include an item identifier, a put or take indicator, locations represented by positions along three axes of the area of real space, and a timestamp.

19. The non-transitory computer readable storage medium of claim 17, wherein the area of real space includes a plurality of inventory locations, and matching the coordinates of cells in the plurality of cells with inventory locations in the plurality of inventory locations.

20. The non-transitory computer readable storage medium of claim 17, implementing the method further comprising, calculating scores for cells using sums of puts and takes of inventory items weighted by a separation between timestamps of the puts and takes and the scoring time, and storing the scores in a memory.

21. The non-transitory computer readable storage medium of claim 17, implementing the method further comprising, including rendering a display image representing cells in the plurality of cells and the scores for the cells.

22. The non-transitory computer readable storage medium of claim 17, implementing the method further comprising, selecting a set of inventory items for each cell based on the scores.

23. The non-transitory computer readable storage medium of claim 17, wherein the area of real space includes a plurality of inventory locations, and the coordinates of cells in the plurality of cells correlate with inventory locations in the plurality of inventory locations, implementing the method further comprising:
   specifying a distribution of inventory items in inventory locations in the area of real space as a planogram and storing the planogram in memory,
   and
   determining misplaced items by comparing the data representing inventory matched with cells to the distribution of inventory items in the inventory locations.

24. The non-transitory computer readable storage medium of claim 17, wherein the area of real space includes a plurality of inventory locations, and the coordinates of cells in the plurality of cells correlate with inventory locations in the plurality of inventory locations, implementing the method further comprising:
  determining for an inventory item matched with particular cell whether a count of the particular inventory item in that cell is below a threshold for re-stocking the inventory item on an inventory location correlating with the particular cell.

* * * * *

UNITED STATES PATENT AND TRADEMARK OFFICE
CERTIFICATE OF CORRECTION

PATENT NO. : 10,474,991 B2  
APPLICATION NO. : 16/256355  
DATED : November 12, 2019  
INVENTOR(S) : Jordan E. Fisher et al.

It is certified that error appears in the above-identified patent and that said Letters Patent is hereby corrected as shown below:

In the Claims

In Claim 7, at Column 32, Line 60, after the word "inventory" insert the word -- items --.

In Claim 15, at Column 33, Line 59, after the word "inventory" insert the word -- items --.

In Claim 23, at Column 34, Line 63, after the word "inventory" insert the word -- items --.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*